(12) United States Patent
Socci et al.

(10) Patent No.: US 10,061,081 B2
(45) Date of Patent: Aug. 28, 2018

(54) INTEGRATED PHOTONIC POLARISATION ROTATOR AND SPLITTER AND RELATED METHOD

(71) Applicants: CONSORZIO NAZIONALE INTERUNIVERSITARIO PER LE TELECOMUNICAZIONI (CNIT), Parma (IT); Luciano Socci, Milan (IT)

(72) Inventors: Luciano Socci, Milan (IT); Marco Romagnoli, Parma (IT)

(73) Assignees: Luciano Socci, Milan (IT); CONSORZIO NAZIONALE INTERUNIVERSITARIO PER LE TELECOMUNICAZIONI (CNIT), Parma (IT)

( * ) Notice: Subject to any disclaimer, the term of this patent is extended or adjusted under 35 U.S.C. 154(b) by 0 days.

(21) Appl. No.: 15/524,005

(22) PCT Filed: Nov. 3, 2015

(86) PCT No.: PCT/EP2015/075609
§ 371 (c)(1),
(2) Date: May 3, 2017

(87) PCT Pub. No.: WO2016/071345
PCT Pub. Date: May 12, 2016

(65) Prior Publication Data
US 2017/0315294 A1 Nov. 2, 2017

(30) Foreign Application Priority Data
Nov. 3, 2014 (IT) .............................. RM2014A0633

(51) Int. Cl.
*G02B 6/00* (2006.01)
*G02B 6/126* (2006.01)
(Continued)

(52) U.S. Cl.
CPC ........... *G02B 6/126* (2013.01); *G02B 6/1228* (2013.01); *G02B 2006/12116* (2013.01)

(58) Field of Classification Search
CPC .................... G02B 6/126; G02B 6/128; G02B 2006/12116
(Continued)

(56) References Cited

U.S. PATENT DOCUMENTS 9,122,006 B1 * 9/2015 Roth ...................... G02B 6/126

* cited by examiner

*Primary Examiner* — Jerry Blevins
(74) *Attorney, Agent, or Firm* — Volpe and Koenig, P.C.

(57) ABSTRACT

In an integrated polarization splitting and rotating photonic device comprising at least one first waveguide; a second waveguide, both said waveguides extending from an input section to an output section; a top cladding; a bottom cladding and a symmetry-breaking layer so as to form an optical guiding structure in a wafer chip, said top and bottom claddings extending throughout the whole optical guiding structure sandwiching said waveguides therebetween, said symmetry-breaking layer extends in the optical guiding structure at least over the whole guiding structure length, and, at the input section, the at least one first waveguide core has a predetermined width through the optical guiding structure to the output section, receiving an input light signal, and further, the second waveguide core, both at the input and the output section, has a width narrower than said predetermined width of the first waveguide core; so that the optical guiding structure guides a first mode substantially confined within said at least one first waveguide core and a second mode substantially confined within said second semiconductor waveguide core said first and said second modes having the same polarization at the output section.

14 Claims, 17 Drawing Sheets

(51) Int. Cl.
*G02B 6/122* (2006.01)
*G02B 6/12* (2006.01)

(58) Field of Classification Search
USPC .......................................................... 385/11
See application file for complete search history.

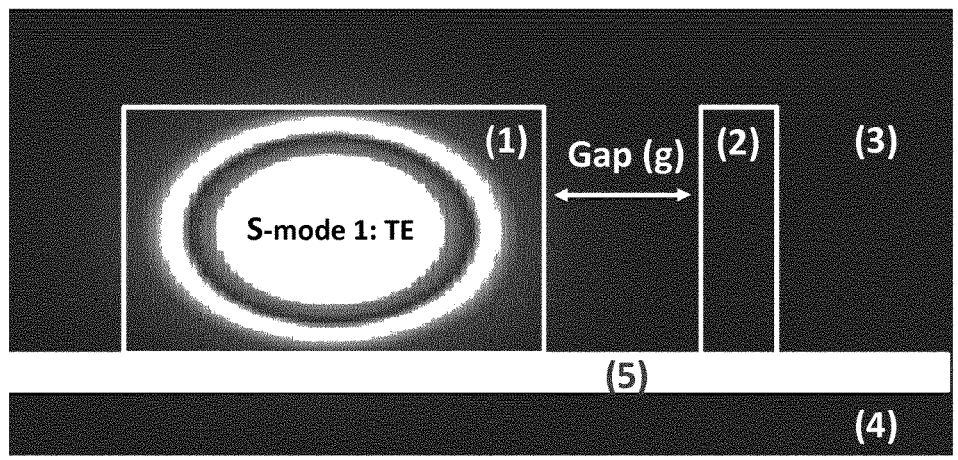
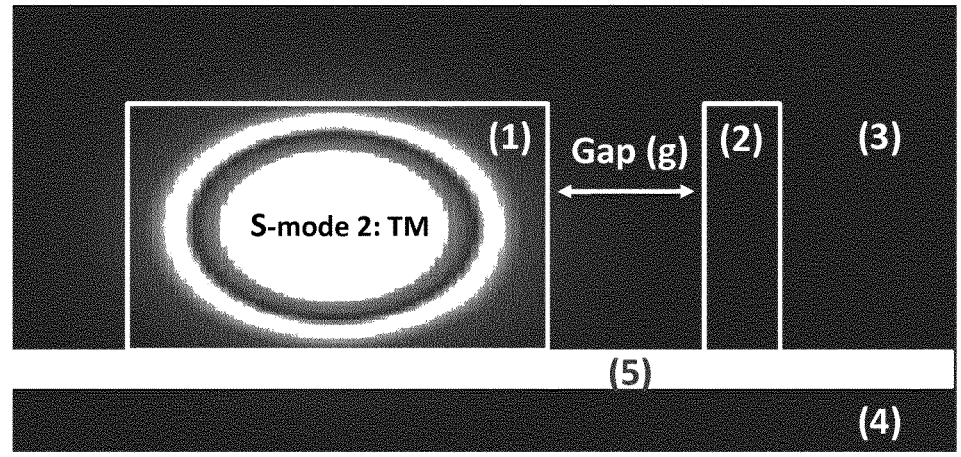
Fig. 2A

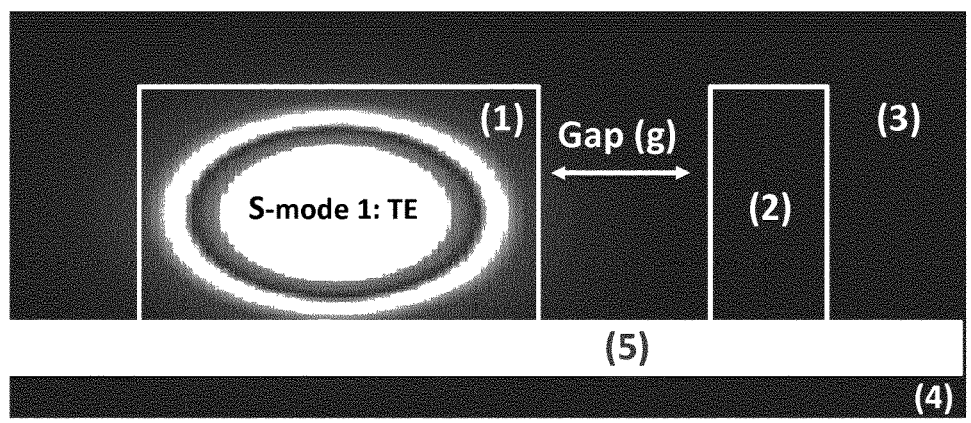
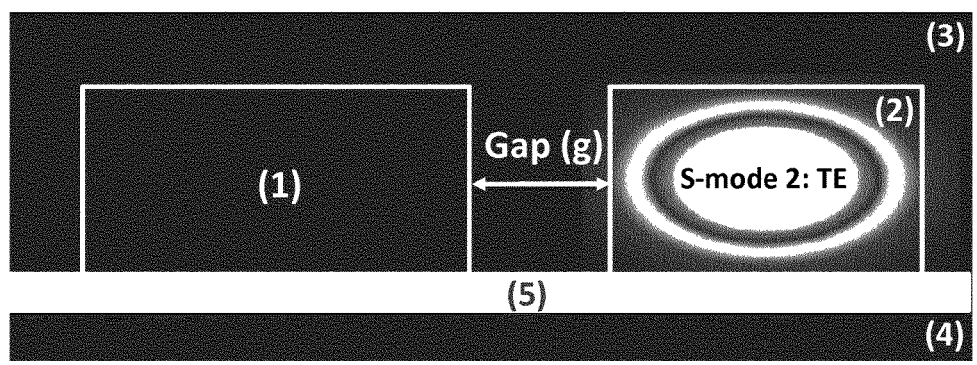
*Fig. 2B*

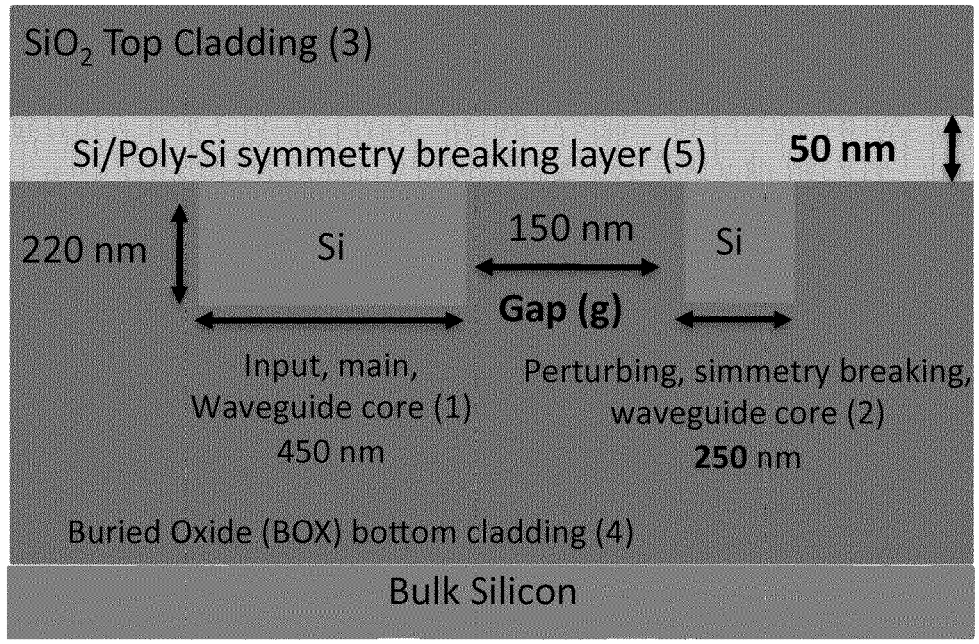
*A) Input Section*
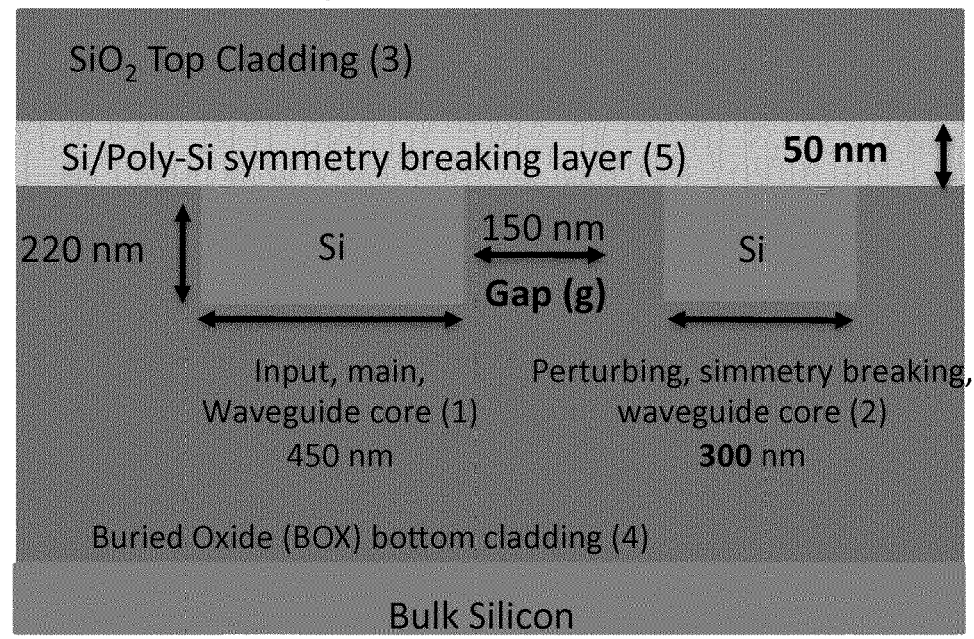
*B) Output Section*
*Fig. 4*

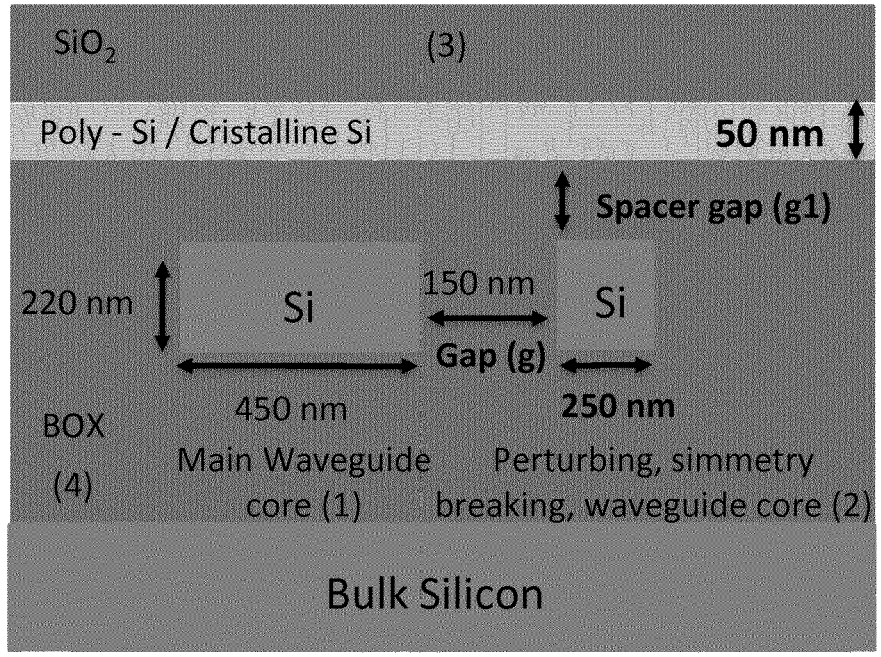
A) Input Section
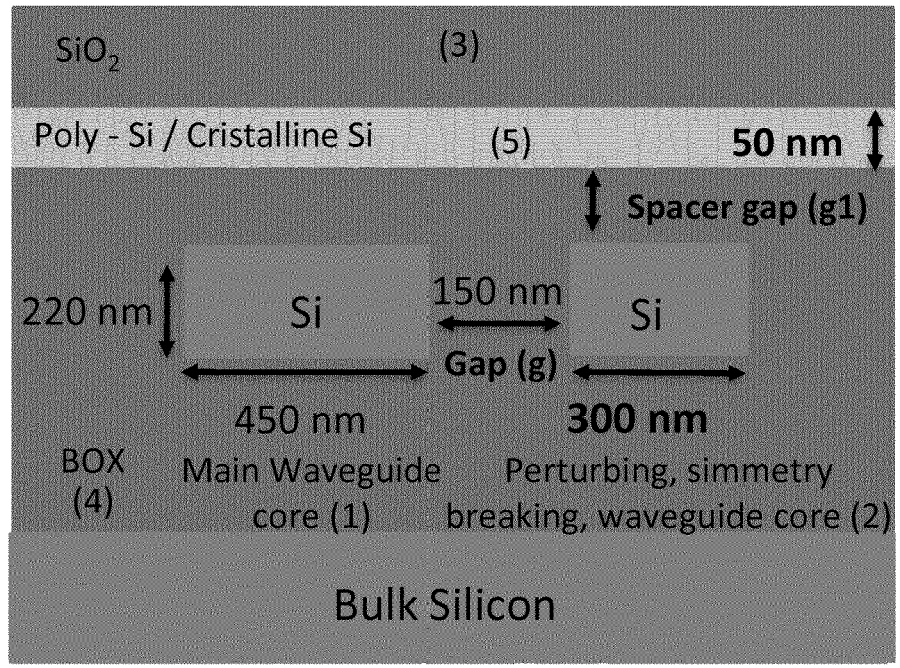
B) Output Section
Fig. 8

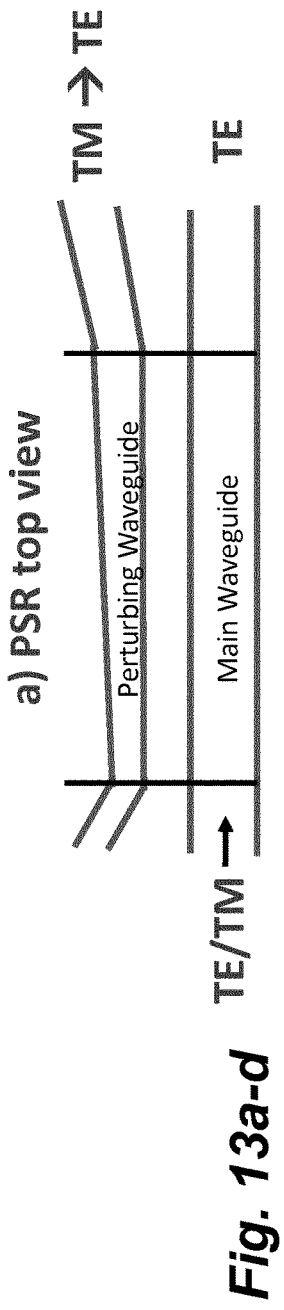
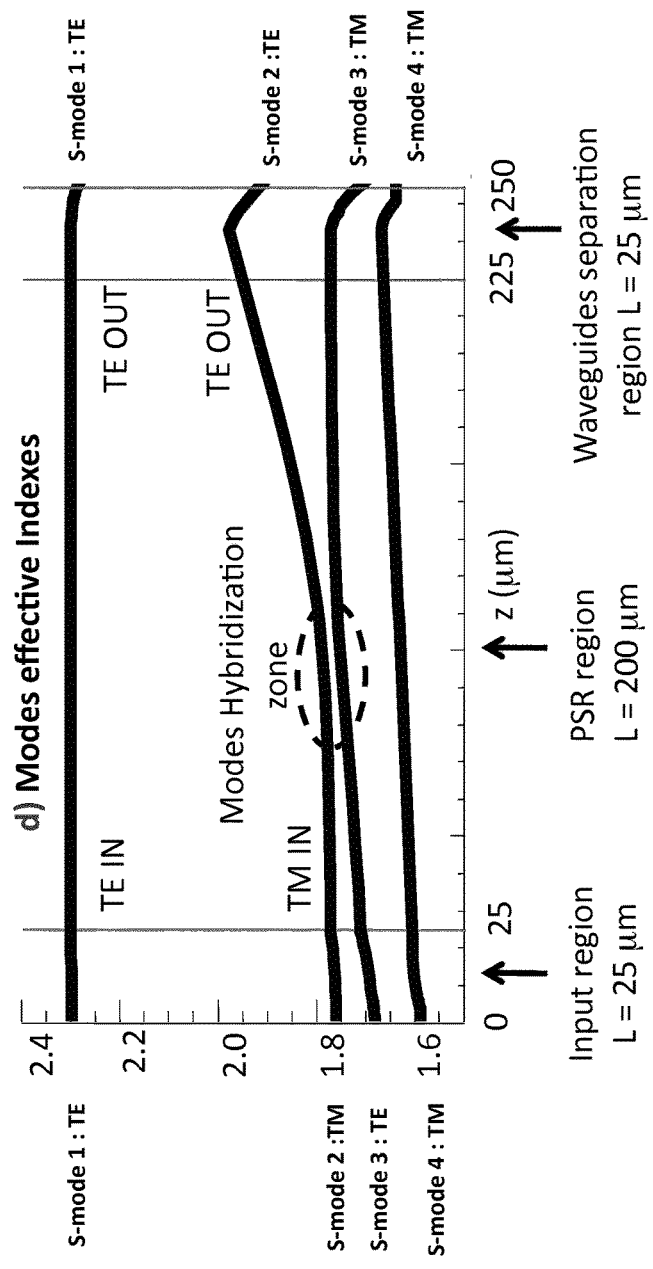
Fig. 13a-d

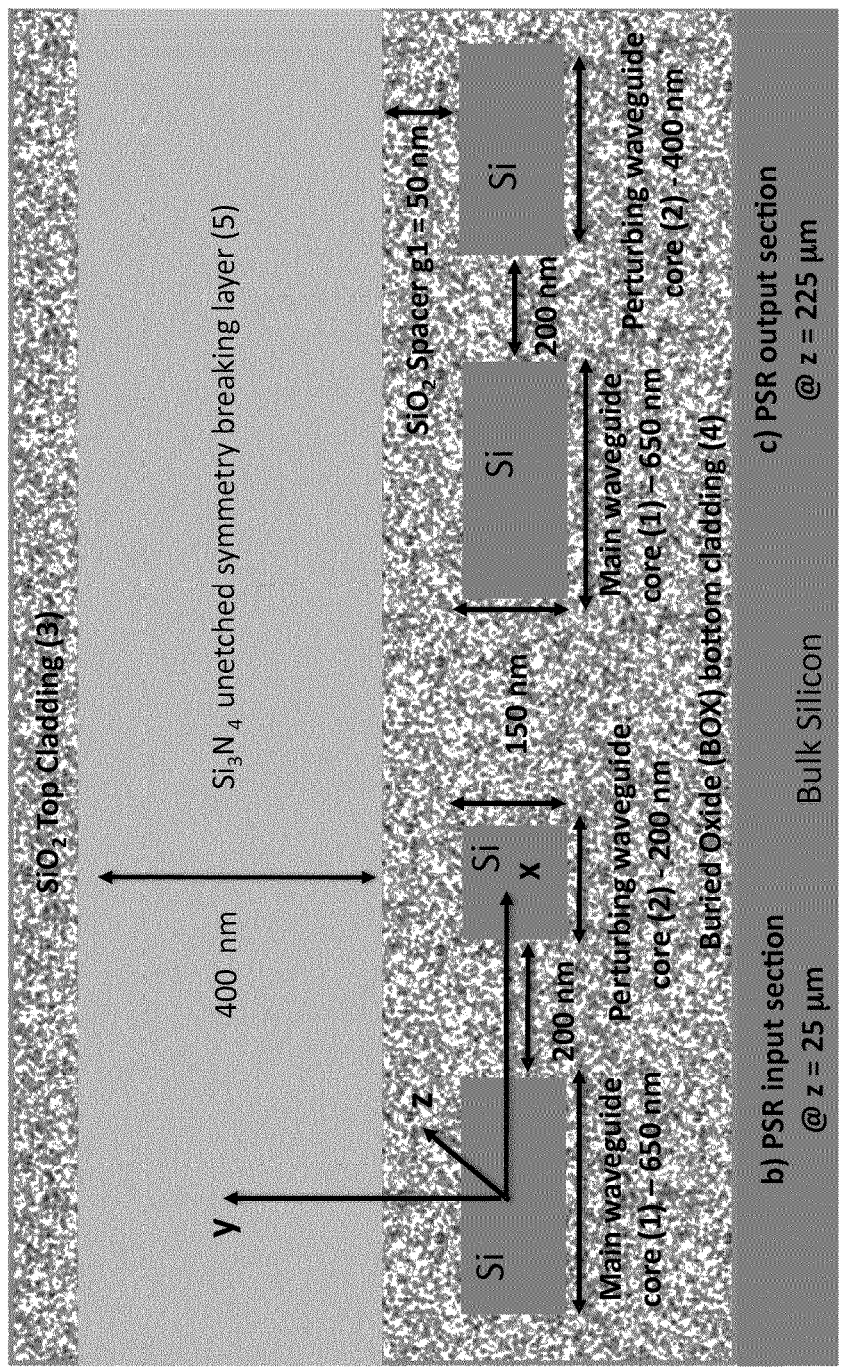
Fig. 13b-c

INTEGRATED PHOTONIC POLARISATION ROTATOR AND SPLITTER AND RELATED METHOD

BACKGROUND OF THE INVENTION

1. Field of the Invention

The present invention concerns an integrated photonic device, in particular an integrated polarization splitting and rotating photonic device to be implemented in a wafer chip. This kind of device is conceived to receive through an optical fibre a light input, to manage the polarization thereof.

More specifically, the invention refers to a polarization and rotating photonic device, commonly referred as PSR device also in the following, comprising at least one first waveguide core, a second waveguide core, both said waveguide cores extending from an input section to an output section and being separated by a gap at least at the output section, a top cladding and a bottom cladding, said claddings extending along the whole optical guiding structure enclosing said waveguides there between, so as to form an optical guiding structure in a chip.

2. Description of the Prior Art

Polarization handling is one of the trickiest issues in Silicon Photonics. Due to the intrinsic high birefringence of the High index contrast waveguides, TE modes are propagated with a completely different phase and group velocity than TM modes, causing several impairments in the optical transmissions systems.

TE modes are commonly known by the skilled in the art as those modes having the electric field main component substantially parallel to the chip surface, while TM modes have the electric field main component substantially orthogonal to the chip surface.

Several attempts have been carried out to manage the intrinsic polarization dependence of High index contrast waveguides; to date, the most promising solution is to use a polarization diversity scheme as proposed in by Tymon Barwicz et al. "Polarization-transparent microphotonic devices in the strong confinement limit"—nature photonics |VOL 1|January 2007| www.nature.com/naturephotonics.

To implement a polarization diversity scheme a device called Polarization Splitter and Rotator (PSR) is needed, and his complementary device, known as Polarization Combiner, which is nothing else than a PSR with reversed input and output.

A PSR is, generally speaking, an integrated optical device comprising at least one input waveguide and at least two output waveguides, said device being adapted to receive an optical signal having a scrambled polarization—a mix of both TE and TM with random amplitudes and phases—and propagate them to a respective output port by splitting the TE and TM components while the TM component is also rotated into a TE mode due to a 3D symmetry-breaking with respect to the input waveguide.

Under this scheme, it is important to underline that the splitting and rotating processes do not necessarily take place in the aforementioned order i.e. a Polarization Rotator Splitter (PRS) could be envisaged instead of a PSR.

Examples of PRS are known from Daoxin Dai et al. "Novel concept for ultracompact polarization splitter-rotator based on silicon nanowires"—23 May 2011/Vol. 19, No. 11/OPTICS EXPRESS, and from Yang Yue et al. "Silicon-on-insulator polarization splitter using two horizontally slotted waveguides" OPTICS LETTERS/Vol. 35, No. 9/May 1, 2010.

In any case, due to the linear behaviour of the device, the final result is unchanged regardless of the processes order, namely the two input polarizations TE/TM will be converted into two TE modes propagating in the output waveguides.

The PSR or PRS disclosed in this prior art have two consecutive and well separated splitting and rotation sections (or rotation and splitting); this is not very length effective leading to a much longer device than actually needed, and constitutes a major disadvantage in a context where the close packet of the devices is an essential requirement for a cost effective product and loss reduction.

Further examples are known from Jing Zhang et al. "Silicon-Waveguide-Based Mode Evolution Polarization Rotator", IEEE JOURNAL OF SELECTED TOPICS IN QUANTUM ELECTRONICS, VOL. 16, NO. 1, JANUARY/FEBRUARY 2010; Wesley D. Sacher et al. "Si$_3$N$_4$-on-SOI Polarization Rotator-Splitter Based on TM0-TE1 Mode Conversion"; L. M. Augustin et al. "A Compact Integrated Polarization Splitter/Converter in InGaAsP-InP", IEEE PHOTONICS TECHNOLOGY LETTERS, VOL. 19, NO. 17, Sep. 1, 2007; US 2014/0133796 A1; CN 203311029 U; and US 2014/0270622 A1.

This prior art drawback is inherent to the PSR (or PRS) schemes therein disclosed due to the waveguides arrangements therein adopted.

In Jing Zhang et al. an effective polarization rotation is achieved by exploiting an adiabatic principle and by breaking the symmetry with respect to the both axis. However, the fabrication process of the polarization rotator of Jing Zhang et al. requires two mask levels and a fine control of elements with a small feature size.

In optics, the adiabatic principle is defined by the adiabatic theorem, i.e. a physical system remains in its instantaneous eigenstate if a given perturbation is acting on it slowly enough and if there is a gap between the eigenvalue and the rest of the Hamiltonian's spectrum. Therefore, an adiabatic process is defined so as, when gradually changing conditions, to allow the system to adapt its configuration, hence the probability density is modified by the process. If the physical system starts in an eigenstate of the initial Hamiltonian, it will end in the corresponding eigenstate of the final Hamiltonian.

In conclusion, a slow change of a waveguide geometry over lengths greater than the wavelengths involved of many orders of magnitude, i.e. in this case μm vs. nanometers or hundreds of μm vs. few μm, leads to an adiabatic transformation of the light therein.

Another example of simple adiabatic rotator is disclosed in CN 103336330 A, exploiting a continuous 3D symmetry-breaking wherein the input section thereof is adapted to receive a scrambled TE/TM signal, and to propagate it to the rotator output section, which is adapted to support an orthogonal set of modes with respect to the input section. In other words, the rotator output consists of another TM/TE scrambled signal with TE and TM interchanged with respect to the input. However, the rotator output section cannot support the first two modes, i.e. a first and a second, having the same polarization.

In Tymon Barwicz et al., a complete PRS is described based on the rotator of Jing Zhang et al. and an adiabatic splitter the two sections being one after the other.

In the other prior examples the top-bottom symmetry-breaking is simplified with respect to the previous ones, since it is achieved with a uniform cladding or core layer and requires a single mask fabrication process at the expense of the device compactness.

On the other hand a slightly different physics is used for the conversion to a higher order mode.

Daoxin Dai et al. discloses an adiabatic polarization rotating waveguide wherein the inputted fundamental $TM_0$ mode is converted into the higher order $TE_1$ mode when the waveguide width is increased.

This effect is achieved by breaking the top-bottom symmetry of the Silicon waveguide by using a top cladding with a different material than the bottom one.

On the other hand the $TE_0$ inputted mode is left unchanged and propagated to the $TE_0$ mode at the rotator output.

At its input section the polarization rotator waveguide is single mode for both TE/TM polarization, while at the rotator output said waveguide supports at least two modes for the TE polarization, namely $TE_0$ and $TE_1$, and at least one mode for the TM polarization, namely $TM_0$.

At the polarization rotator output wherein the $TM_0$ has been $TE_1$, a standard, non-adiabatic, directional coupler it is exploited to spatially separate the $TE_1$ mode by coupling it into the $TE_0$ mode of the adjacent waveguide.

Summarizing, in order for it to work, the Daoxin Dai et al. polarization rotator needs the silicon waveguide width to be increased until it becomes multi mode at least for the TE polarization, while at the same time the top-bottom symmetry is broken by the presence of a top-bottom cladding with a different refractive indexes.

Polarization splitting is then achieved with a standard directional coupler.

The device disclosed in Daoxin Dai et al. is a polarization rotator and splitter (PRS) wherein the polarization rotation and the splitting are achieved in two different, consecutives and well separated sections, the rotator section being adiabatic while the splitting one is non adiabatic standard directional coupler.

Yang Yue et al. discloses a polarization rotating device exploiting $TM_0$-$TE_1$ conversion wherein the top-bottom symmetry-breaking is achieved by an additional ridge layer having the same refractive index than the core one instead than exploiting two different claddings as in Daoxin Dai et al. Polarization splitting is then achieved with a standard, non adiabatic, directional coupler.

The device disclosed in Wesley D. Sacher et al. is a polarization rotator and splitter (PRS) wherein the polarization rotation and the splitting are achieved in two different, consecutives and well separated sections, the rotator section being adiabatic while the splitting one is non adiabatic standard directional coupler.

Wesley D. Sacher et al. discloses a polarization rotating device exploiting $TM_0$-$TE_1$ conversion wherein the top-bottom symmetry-breaking is achieved by an additional top layer having a lower refractive index than the core one instead than exploiting two different claddings as in Daoxin Dai et al. In the Wesley D. Sacher et al., polarization rotator the symmetry-breaking layer is made in SiN wherein the core waveguide is Silicon. Polarization splitting is then achieved with a standard adiabatic coupler.

The device disclosed in Wesley D. Sacher et al. is then a polarization rotator and splitter (PRS) wherein the polarization rotation and the splitting are achieved in two different, consecutives and well separated sections, both the rotator section and the splitter one being adiabatic.

In Wesley D. Sacher et al., the top-bottom symmetry-breaking layer does not extend through the entire device length but only across the polarization rotating section since it is not needed in the splitting section when done as per the Wesley D. Sacher et al.'s teachings.

In all the devices disclosed in the prior art, the polarization rotating section is separated by the polarization splitting one thereby leading to a relatively long devices having a length in the order of 400 μm or longer.

In the first section, namely the polarization rotating one, the higher order mode $TE_1$ is excited starting from the $TM_0$ inputted mode, in this sense the polarization is effectively rotated, but at the expense of exciting an higher order multi-lobed mode.

In the second section the $TE_1$ mode is coupled to the $TE_0$ mode of an adjacent waveguide thereby realizing the polarization splitting section which can be adiabatic as in the previous examples.

In Wesley D. Sacher et al., the top—bottom symmetry-breaking layer is tapered down before the start of the splitting section in order to complete transfer the $TE_1$ mode generated in the first section to the underlying level before it can be coupled to the adjacent waveguide in the splitting section; this further increases the device length.

In prior art examples of a NON adiabatic PSR are also widely known.

For example, in "Fabrication tolerant polarization splitter and rotator based on a tapered directional coupler" by Yunhong Ding et al, 27 Aug. 2012/Vol. 20, No. 18/OPTICS EXPRESS, a PSR based on mode coupling instead than modes adiabatic evolution is reported.

The experimental signature of the prior art device being non adiabatic is for example its bandwidth which is much narrower than the devices herein disclosed and the TM/TE conversion rate length dependence which is sinusoidal with length in prior art while exhibits a saturated behavior in the devices herein disclosed.

SUMMARY OF THE INVENTION

According to the principle underlying the present invention to overcome the drawbacks mentioned with reference to the prior art, rotation and splitting can be unified together thereby leading to a much more compact device.

The device length reduction is achieved by eliminating the need of exciting the higher order mode $TE_1$, but directly exciting the $TE_0$ of a second waveguide core, directly starting from the input section of the present photonic device as defined in appended claim 1, and following the steps of appended method claim 11.

Namely, in the photonic device according to the present invention, breaking the top-bottom symmetry through the entire device length is achieved by a symmetry-breaking layer substantially extending throughout the whole device length, or possibly throughout the whole wafer chip, so as to interact with the waveguide cores of the device, so as to lead to a much more compact device since it also eliminates the need of increasing the waveguide width in order to excite the $TE_1$ mode. This length for exciting the $TE_1$ mode is then saved.

In the PSR herein disclosed none of the waveguide core widths is increased up to excite any multi-lobed $TE_1$ mode, in other words, said waveguide cores width can be increased until they remain single mode; on the other hand all of the guided modes along the PSR structure have a single lobe (see FIG. 2).

Differently from the prior art, the photonic devices of the invention does not involve any separate polarization rotating or splitting section while rotation and splitting take place at the same time through the entire device length.

BRIEF DESCRIPTION OF THE DRAWINGS

FIG. 2A shows a magnified image of the input section of the device of FIG. 1, illustrating TM and TE;

FIG. 2B shows a magnified image of the output section of the device of FIG. 1, illustrating TM and TE;

FIG. 4 shows both the input and the output sections of a specific embodiment of the device of FIG. 1;

FIG. 8 shows both the input and the output sections of a further specific embodiment of the device of FIG. 1, wherein a spacer gap $g_1$ is highlighted;

FIGS. 13ad and 13bc shows both the input and the output sections of a another specific embodiment of the device of FIG. 1, in particular a $Si_3N_4$ on SOI polarization splitting rotating device (PSR), namely a top view (a); the input/output cross sections (b) and (c); and the PSR modes effective indexes upon propagation (d), respectively.

DESCRIPTION OF THE INVENTION

The most effective way to implement a PSR (or PRS) in a photonic wafer chip, namely in silicon made waveguides or optical fibres, is to exploit the above discussed adiabatic principle.

The use of the adiabatic principle in the contest of integrated optical waveguides consists of a slow variation, compared to the guided light's wavelength, of one or more of the waveguides parameters so that one or more properties of the guided light (modes) can be slowly transformed from an input value to an output value without suffering optical losses due to coupling to other modes or scattering to the leaky unguided modes.

When infrared light is used, the guided light wavelength is in the order of one μm, so that the typical length of an adiabatic device ranges from tenths to hundreds μm up to one millimetre.

Polarization is among the properties of the guided light, which can be fully changed—namely TE to TM or vice versa —using the adiabatic principle.

By the term "modes", in this context it is meant the super modes of the entire input/output or any intermediate wave guiding section comprising at least one waveguide core, and not the modes of the individual waveguides.

Therefore, the term "super-modes" has to be construed in the standard sense for the skilled man in the context of integrated optics. The term modes and the term super-modes will be used here as synonyms unless otherwise stated.

Figure 1:
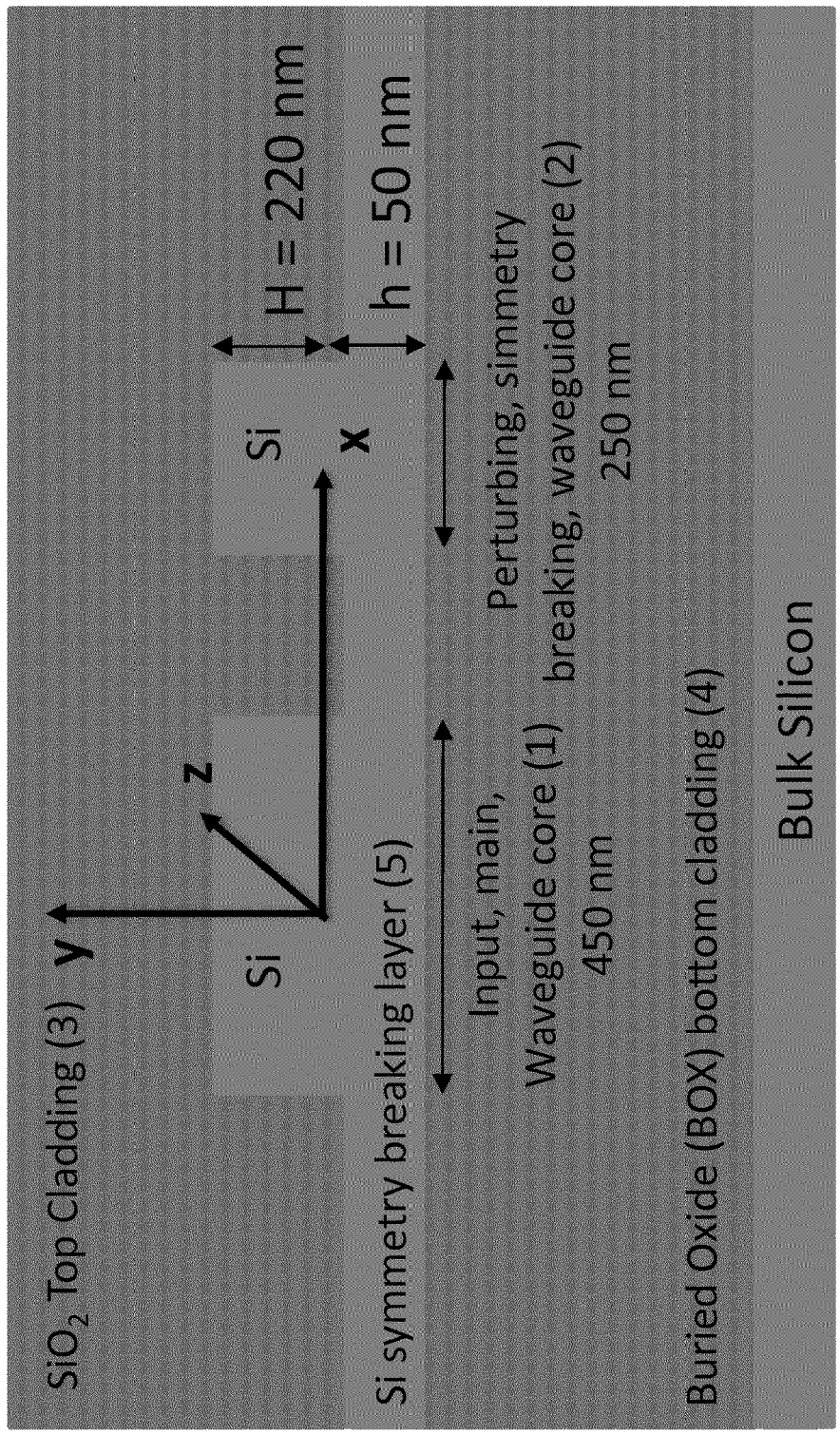
FIG. 1 shows a schematic view of an input section structure of an embodiment of a photonic polarization rotating and splitting (PSR) device according to the invention.

To this purpose symmetry must be broken at least in one direction with respect to the input waveguide where both TE/TM modes are launched, namely symmetry must be broken at least in the top-bottom or right-left direction with respect to the input waveguide (FIG. 1).

Figure 2:
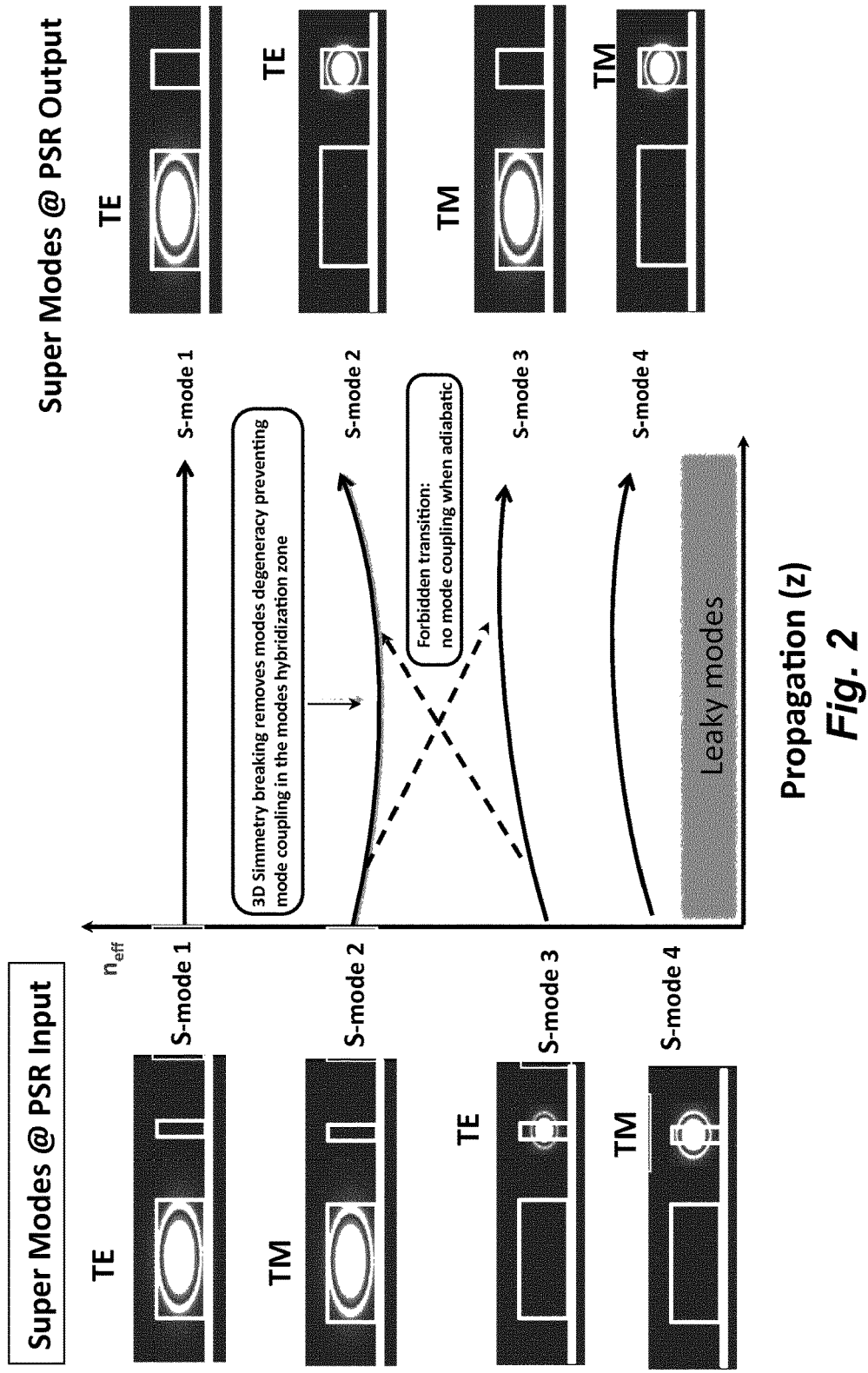
FIG. 2 illustrates the physical principle underlying the operation of the photonic device of FIG. 1.
Figure 3:
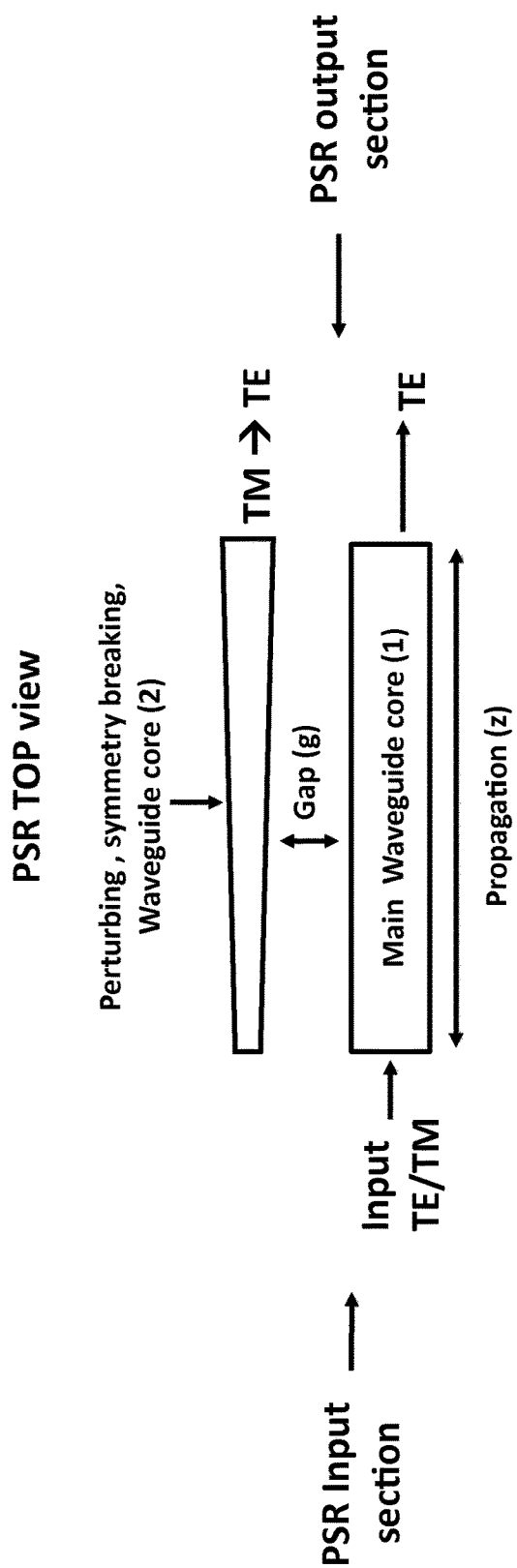
FIG. 3 shows a schematic top view of the waveguides of the device of FIG. 1.

With reference to FIGS. 2 and 3, a short physic explanation of the so-called adiabatic following is given.

At the left side of FIG. 2—and magnified in FIG. 2A—it is shown an input section of a PSR device comprising at least one first waveguide core 1, a second waveguide core 2, both said waveguide cores extending from an input section to an output section and being separated by a gap g at least at the output section, a top cladding 3 and a bottom cladding 4, said claddings extending along the whole optical guiding structure enclosing said waveguide cores there between, so as to form an optical guiding structure in a chip.

The input section comprises a first waveguide core 1 of said first waveguide, having a predetermined first width, and a second waveguide core 2 of said second waveguide, having a second corresponding width narrower than the first width, said cores being separated by a gap g. TE/TM input signal is inputted only in said first waveguide core 1. The meaning of the term narrower referred to the core width will be clarified in the following.

The top and bottom claddings 3, 4 have refractive indexes, which is lower than the ones of said waveguide cores, which are preferably made of Silicon, AlGaAs, Ge, or another semiconductor, $Si_3N_4$, SIN or a wide gap semiconductor.

According to the invention, a top-bottom symmetry-breaking layer 5 is placed at the waveguide cores, extending over the whole length of the photonic device. The position of the symmetry-breaking layer 5 is in close optical proximity, or even in contact with the top or the bottom sides of the waveguides cores 1, 2. It has refractive indexes lower or equal or greater than the ones of said waveguide cores.

The thickness of said top-bottom symmetry-breaking core layer can be lower, equal or greater than the one of said waveguide cores depending of its refractive index. As a general rule, the higher the refractive index difference between said top-bottom symmetry-breaking core layer and the waveguides core, the thinner the thickness of said top-bottom symmetry-breaking core layer and vice-versa.

In the embodiments of the referred Figures, the symmetry-breaking layer is placed in contact with the bottom side of the waveguides, sandwiched between said top and bottom claddings 3, 4.

All the aforementioned elements are arranged so that to form a optical guiding structure adapted to guide a single mode for each input polarization TE and TM, each mode being substantially located in said first waveguide core 1 at the input section, and labelled accordingly in FIG. 2A. Third and forth modes are also present, but weakly guided in the second narrower waveguide core 2 and they have the polarization reported in FIGS. 2 and 2A.

Summarizing, at the input section the disclosed guiding structure has the modes arrangement and distribution shown in FIG. 2A, namely:
- a first order mode (super mode) having a TE polarization substantially located in said first waveguide core 1;
- a second order mode (super mode) having a TM polarization substantially located in said first waveguide core 1;
- a third order mode (super mode) having a TE polarization substantially located in said second waveguide core 2; and
- a fourth order mode (super mode) having a TM polarization substantially located in said second waveguide core 2.

By the term first order mode it is meant the mode with the highest effective index as generally used by the skilled in the art in the context of integrated optics. The other guided modes are named accordingly, so that the second order mode is the mode with the second highest refractive index, and so on while unguided modes are called leaky modes as understood by the skilled in the art.

On the right side of FIG. 2—and magnified in FIG. 2B—it is conversely reported the modes distribution at the output section of the PSR.

The only difference with respect to the input section is that the width of the narrower second waveguide core 2 at the input section has been increased while remaining always narrower than said first width. In this embodiment, the first width of said first waveguide core 1 remains constant through the whole length of the photonic device. All the other parameters of the input section are left unchanged in particular thickness and width of any cladding and layer.

As it can be seen, the second and the third order mode flip and their order is changed, in detail the mode distribution of the output section is the following:
- a first order mode (super mode) having a TE polarization substantially located in said first waveguide core 1;
- a second order mode (super mode) having a TE polarization substantially located in said second waveguide core 2 wherein said second waveguide core 2 has been enlarged with respect to the input section, but yet still narrower than said first waveguide core 1 at the output;
- a third order mode (super mode) having a TM polarization substantially located in first waveguide core 1; and
- a fourth order mode (super mode) having a TM polarization substantially located in said second waveguide core 2.

In other words while, at the input section the modes had an alternate polarization, TE the first order mode and TM the second order one then TE the third and TM the fourth, at the output the first two modes now share the same polarization, namely a TE one.

The same holds for the third and fourth order modes, which at the output share a common TM polarization.

By the term first order mode it is meant the mode with the highest effective index as generally used by the skilled in the art in the context of integrated optics. The other guided modes are named accordingly, so that the second order mode is the mode with the second highest refractive index and so on, while unguided modes are called leaky modes as understood by the skilled in the art.

Therefore, said first mode of the input section is converted upon an adiabatic propagation into said first mode of the output section and said second mode of the input section is converted upon adiabatic propagation into said second mode of the output section. The same holds for said third and forth modes.

In other words, the optical guiding structure guides a first mode with the highest effective refractive index substantially confined within said at least one first waveguide core 1, and a second mode with the second highest effective refractive index substantially confined within said first waveguide core 2, considering that said first and said second modes have a different polarization at the input section.

Further, the optical guiding structure guides a first mode with the highest effective refractive index substantially confined within said at least one first waveguide core, and a second mode with the second highest effective refractive index substantially confined within said second waveguide core, considering that said first and said second modes have the same polarization at the output section.

Now, if the input section is adiabatically transformed into the output one by slowing increasing the width of the second waveguide core 2 from its initial value up to the final one, the modes will evolve accordingly without suffering any optical losses due to mode coupling or to scattering to leaky modes.

In this context "slowly" means on a length scale much longer than the light wavelength in the core material and that term is meant to be construed as the man skilled in the art would do in the contest of integrated optics.

Consequently upon adiabatic conditions, the first order TE mode, substantially located in said first waveguide core 1 at the input section, will evolve into the first order mode at the output, namely a first order TE mode substantially located in said first waveguide core 1.

On the other hand, the second order mode at the input section, a single lobe TM mode substantially located in said first waveguide core 1, will evolve into a second order mode at the output section, namely a single lobe TE mode substantially located in said second waveguide core 2 at the output section.

While the inputted TE mode will substantially propagate unchanged through the PSR, the inputted TM mode will be displaced from the first waveguide core 1 at the input to the second waveguide core 2 at the output, thereby undergoing a polarization splitting, while at the same time will be effectively rotated and will exhibit a TE polarization at the output.

Due to the top-bottom symmetry continuously breaking by the symmetry-breaking layer 5 along the entire device length, both polarization splitting and rotation take place at the same time and it is not possible to clearly identify a splitting section and a rotating one as in the prior art. This feature leads to a much more compact device than the prior art.

Third and forth order mode at the input will undergo similar transformation than the first two, however it is worthy to underline that at the input section usually only a combination of the first and the second order modes are inputted through the first waveguide core 1. Third and fourth order modes are usually not inputted since they are weakly guided. In any case, with reference to FIG. 2 when the third or forth order modes are inputted in the second waveguide core 2, they are propagated through the device respectively to the third and fourth order modes at the output (FIG. 2B) so that a PSR behaviour is in any case observed, but an output TM modes are obtained instead than a TE ones as in the previous discussion.

The combination of said inputted first and second order TE/TM modes in the first waveguide core 1 constitutes a polarization scrambled input signal as previously defined.

In order to further clarify the physics of the adiabatic following, reference is now made to the central portion of FIG. 2 wherein the effective indexes of the modes are qualitatively depicted along the entire PSR device, i.e. as continuous curves from the input to the output section.

The effective indexes curves are labelled accordingly to the input and output section, and their shape is general and typical of this kind of devices, as it is also discussed in prior art.

Under adiabatic conditions, each mode will follow the path defined by its effective index curve without coupling to the other modes.

The presence of the top-bottom symmetry-breaking layer 5 will remove modes degeneracy of second and third modes, namely their effective index curve will not cross at any point, and they are in generally hybrid in the region where their effective indexes curve are closest spaced, meaning that they are not clearly TE or TM. This holds for example for modes 2 and 3 in FIG. 2 and FIGS. 10b and 13d.

It should be noted that, if the symmetry-breaking layer 5 were not present, the curves of second and third modes would have crossed and the mode flipping previously described could not take place due to mode coupling.

Hence, the higher the symmetry breaking, the wider the gap between second and third modes, the shorter the PSR length; in other words, the regime of a full adiabatic behaviour will be reached in a length inversely proportional to the gap between second and third modes effective indexes curves.

In any case, since the guided wavelength is in the order of one μm, a full adiabatic behaviour is generally reached with a 100÷200 μm device length.

The maximum of the symmetry breaking, and consequently the wider gap between modes 2-3 effective indexes curves, takes place when the refractive index of the symmetry-breaking layer 5 material is the same or higher than the waveguide cores 1, 2, for example when the symmetry-breaking layer 5 material is the same as the waveguide cores 1, 2, one, for example a semiconductor which can be Silicon.

As it can be seen in FIG. 3 (top view), the second waveguide core 2 is tapered from the output section to the input section, and the width of the second waveguide core 2 is narrower than said predetermined through the whole optical guiding structure.

Anyway, the width of the second waveguide core 2 may vary but remaining lower than the width of the first waveguide core 1 at least at the output section, so that said first mode of the input section is converted upon an adiabatic propagation into said first mode of the output section and said second mode of the input section is converted upon adiabatic propagation into said second mode of the output section.

In order to further clarify the physics of the adiabatic following, reference is now made to FIGS. 12b, 12c and FIG. 14c.

Under adiabatic conditions, coupling between propagating modes is minimized or inhibited, so that the power launched at the input section into one guided mode remains in that guided mode under its adiabatic evolution; for example the power launched in the first mode of FIG. 12b remains in that mode and the same holds for the other modes, namely for mode (2) shown in FIG. 12c and for modes (3) and (4) (not shown).

Under adiabatic condition, the modes do not couple between each other, they simply evolve between the input and the output section since they are instantaneous eingenstates of the Hamiltonian at any intermediate section of the guiding structure previously defined which comprises said waveguide cores 1, 2 separated by a gap at least at the output section, said top/bottom cladding 3, 4 and said symmetry-breaking layer 5.

This is shown in FIGS. 12b and 12c, wherein TE and TM mode are respectively inputted and the power along the propagation is shown. It is apparent that in both cases the power remains in the mode where it has been launched while said mode evolves along the adiabatic device.

In FIG. 13c, a small residual reversible mode coupling is observed with an overshoot lower than 2% in power which could be further reduced by slightly increasing the PSR length, hence making it even more adiabatic, or by a non-linear tapering.

The same mode coupling suppression is shown in FIG. 14c for the other embodiment therein disclosed.

Summarising, in an adiabatic PSR mode coupling is minimized, or inhibited, by properly choosing the input and output cross sections having the mode ordering and shape previously discussed and by properly choosing the waveguide cores width along the propagation so that to avoid modes phase matching at any point of the PSR length.

In the embodiments herein disclosed, modes phase matching is avoided by keeping the width of said waveguide cores 1, 2 always very different, i.e. with a difference in width always exceeding 100 nm at any PSR section, preferably with a difference in width always exceeding 50 nm at any PSR section, even more preferably 20 nm. This can be generalized by having the first and second waveguide areas always very different along the entire PSR length.

Conversely, a PSR relying on mode coupling is disclosed in prior art, e.g. by Yunhong Ding et al., and it is inherently non adiabatic.

Figure 5:
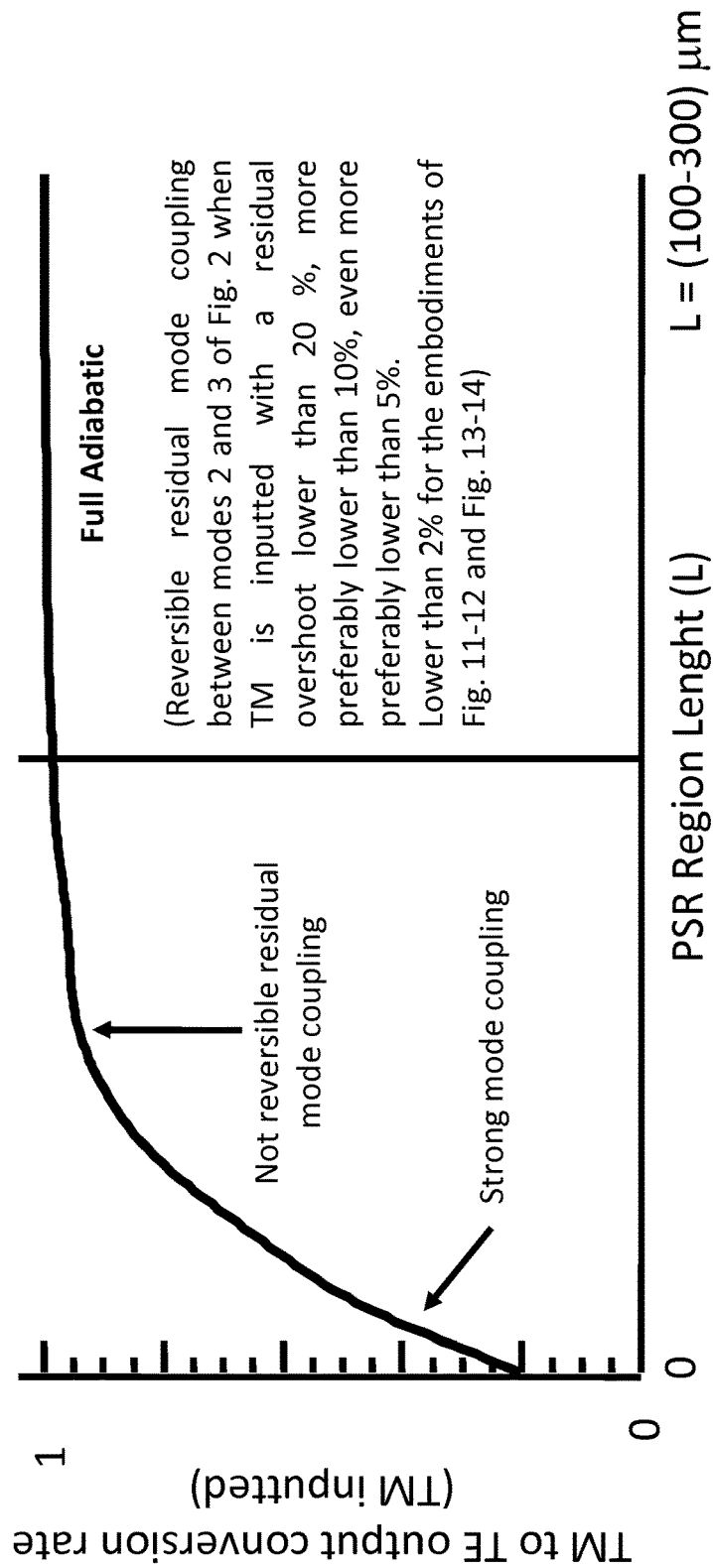
FIG. 5 shows a diagram depicting the TM to TE conversion efficiency vs. the device length of the device of FIG. 4.

In FIG. 5 it is shown the conversion efficiency vs. the PSR length of the device of FIG. 4, but this behaviour is general applying also to the embodiments of FIGS. 9, 10, 11, 12, 13 and 14.

When the PSR length is increased, the full adiabatic regime is achieved and mode coupling is suppressed, in particular between modes 2 and 3 in the region where they are hybrid as shown for example in FIG. 2.

Figure 9:
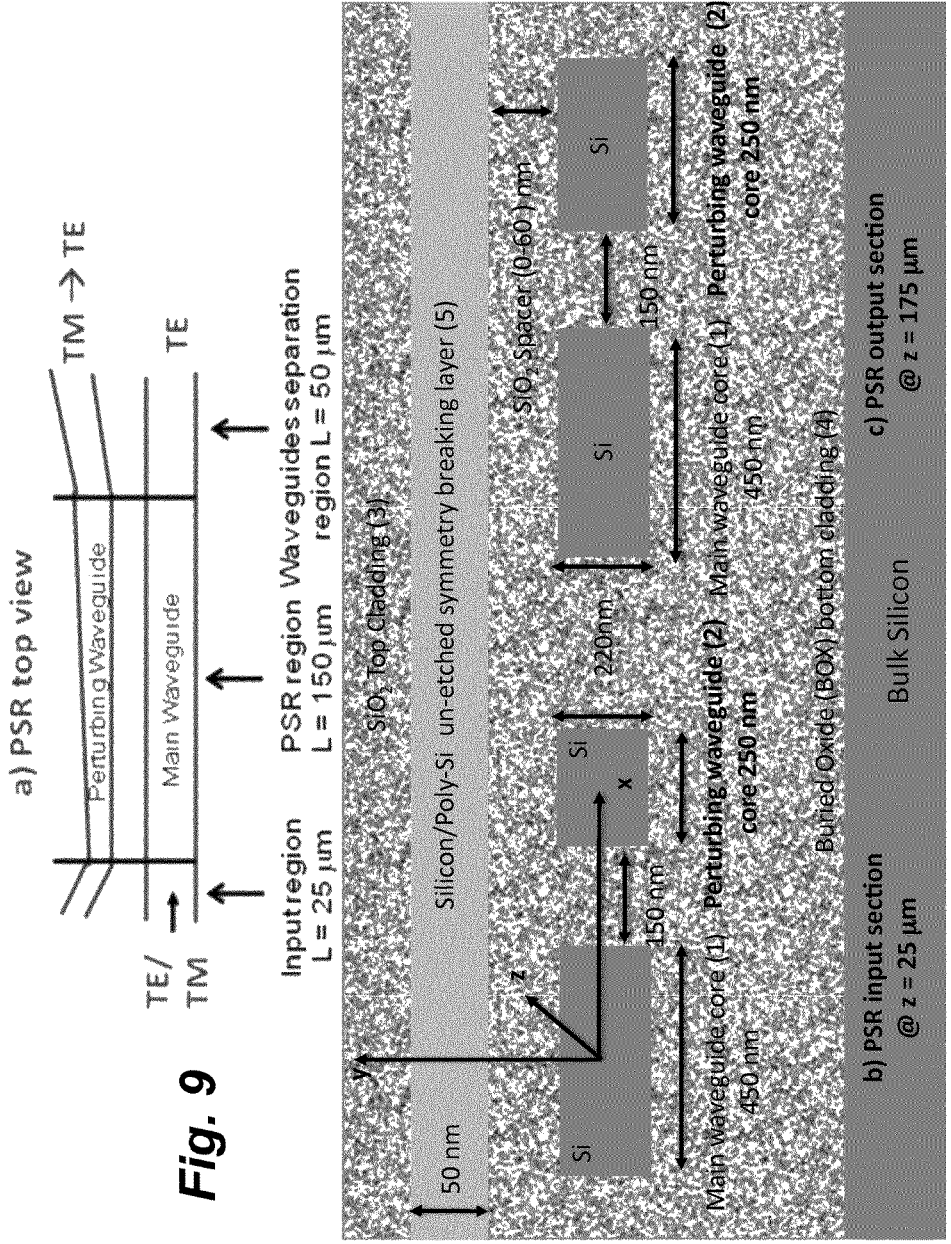
FIG. 9 shows both the input and the output sections of a another specific embodiment of the device of FIG. 1, in particular a SOI polarization splitting rotating device (PSR), namely a top view (a); and input/output cross sections (b) and (c) respectively.

In a full adiabatic PSR, as the ones the embodiments of FIGS. 9 and 13, a reversible residual mode coupling is observed between modes 2 and 3 with a power overshoot lower than 2%.

In this context, reversible coupling means that even if some power (less than 2% for all the PSR's herein disclosed) is initially transferred from mode 2 to mode 3 in the modes hybridization zone, the same power is coupled back from mode 3 to mode 2 so that at the output 100% of the power launched in the mode 2 at the input will appear in the same mode 2 at the output.

In general, a PSR cam be defined as a fully adiabatic device when only a residual reversible mode coupling is observed between modes (2 and 3 or their equivalent for another embodiment) with a power overshoot lower than a predetermined amount which depends on the particular application, preferably:

lower than 20% in power when TM is inputted in the first waveguide core (1);
more preferably lower than 10% in power when TM is inputted in the first waveguide core (1);

even more preferably lower than 5% in power when TM is inputted in the first waveguide core (1) wherein said overshoot is lower than 2% in power when TM is inputted for the embodiments of FIGS. 10, 11, 12, 13 and 14.

Figure 6:
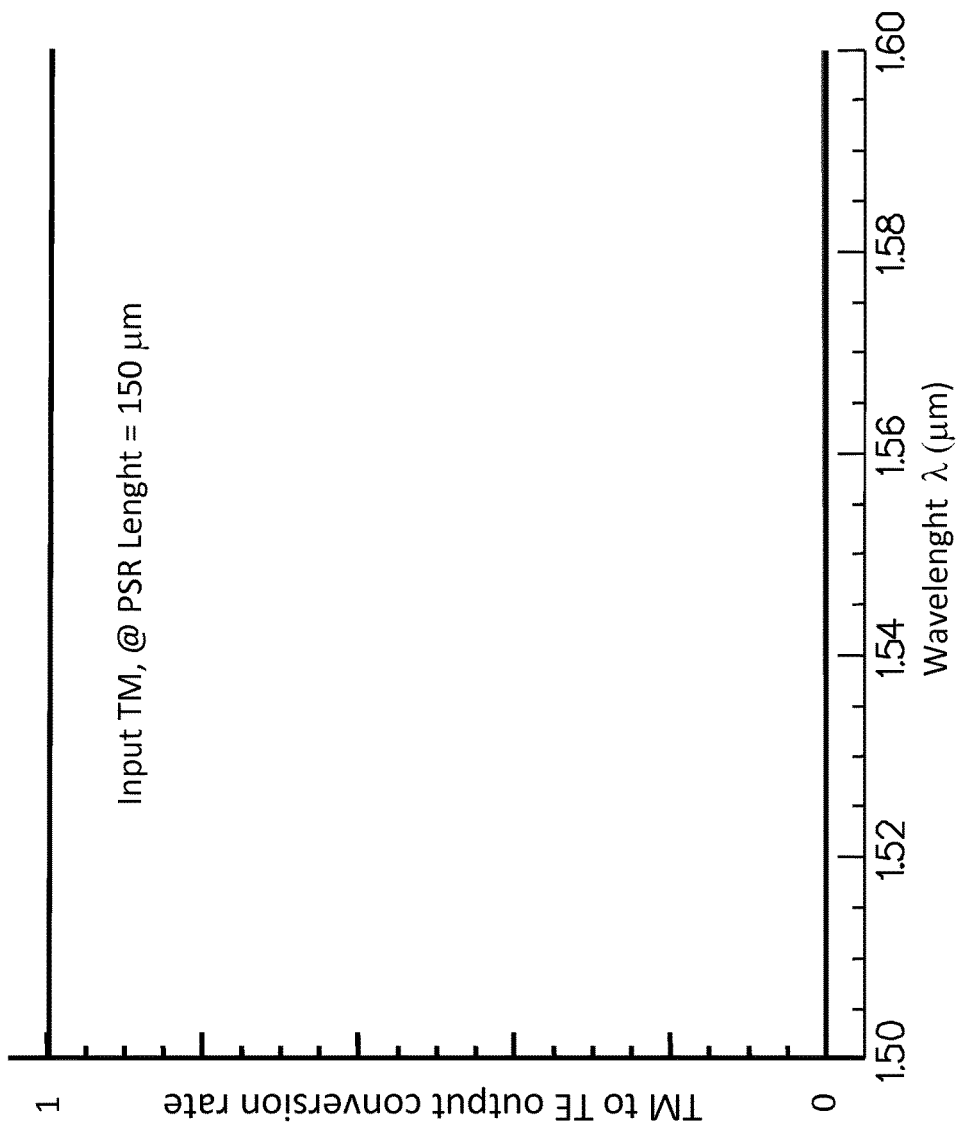
FIG. 6 shows a diagram depicting the TM to TE output conversion rate vs. the bandwidth of the device of FIG. 4.
Figure 10:
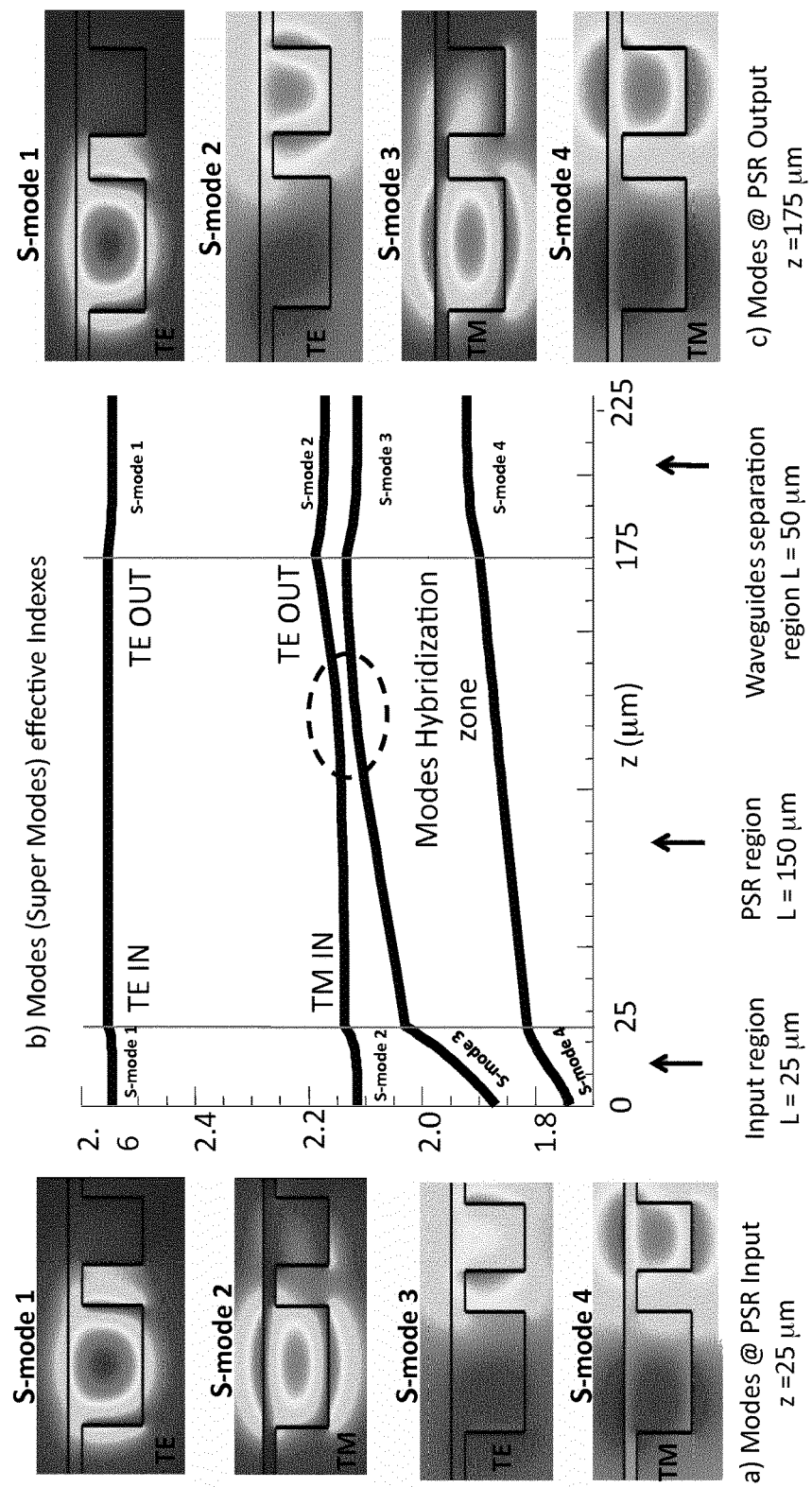
FIG. 10 illustrates the operation of the PSR device of FIG. 9, in particular the modes effective indexes upon propagation (b); and the modes shape at input/output sections respectively (a) and (c)
Figure 11:
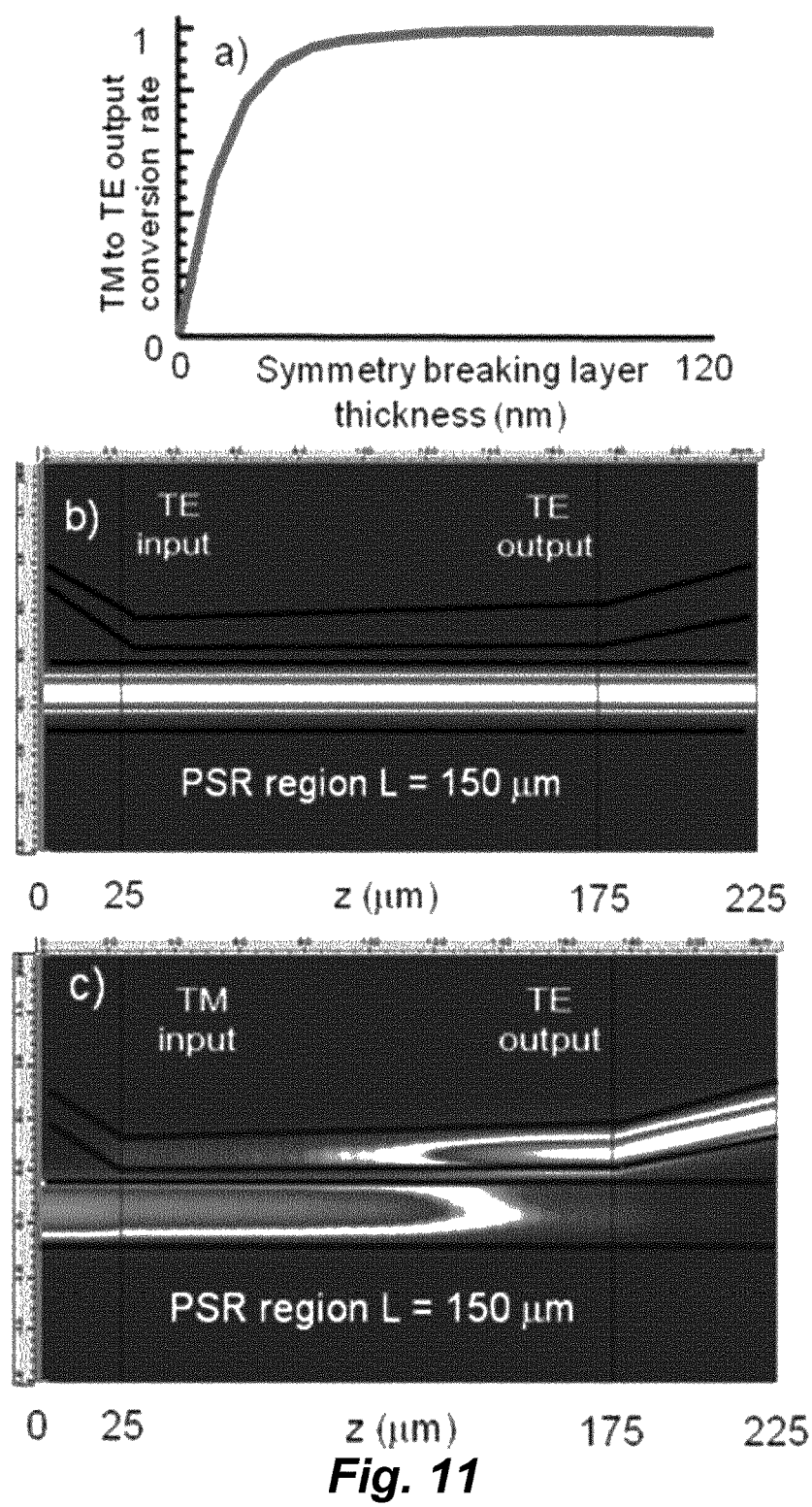
FIG. 11 shows a diagram and images depicting the effect of the symmetry-breaking layer thickness of the device of FIG. 9 (a); and a top view of the TE/TM propagation TE IN (b), TM IN (c)
Figure 12:
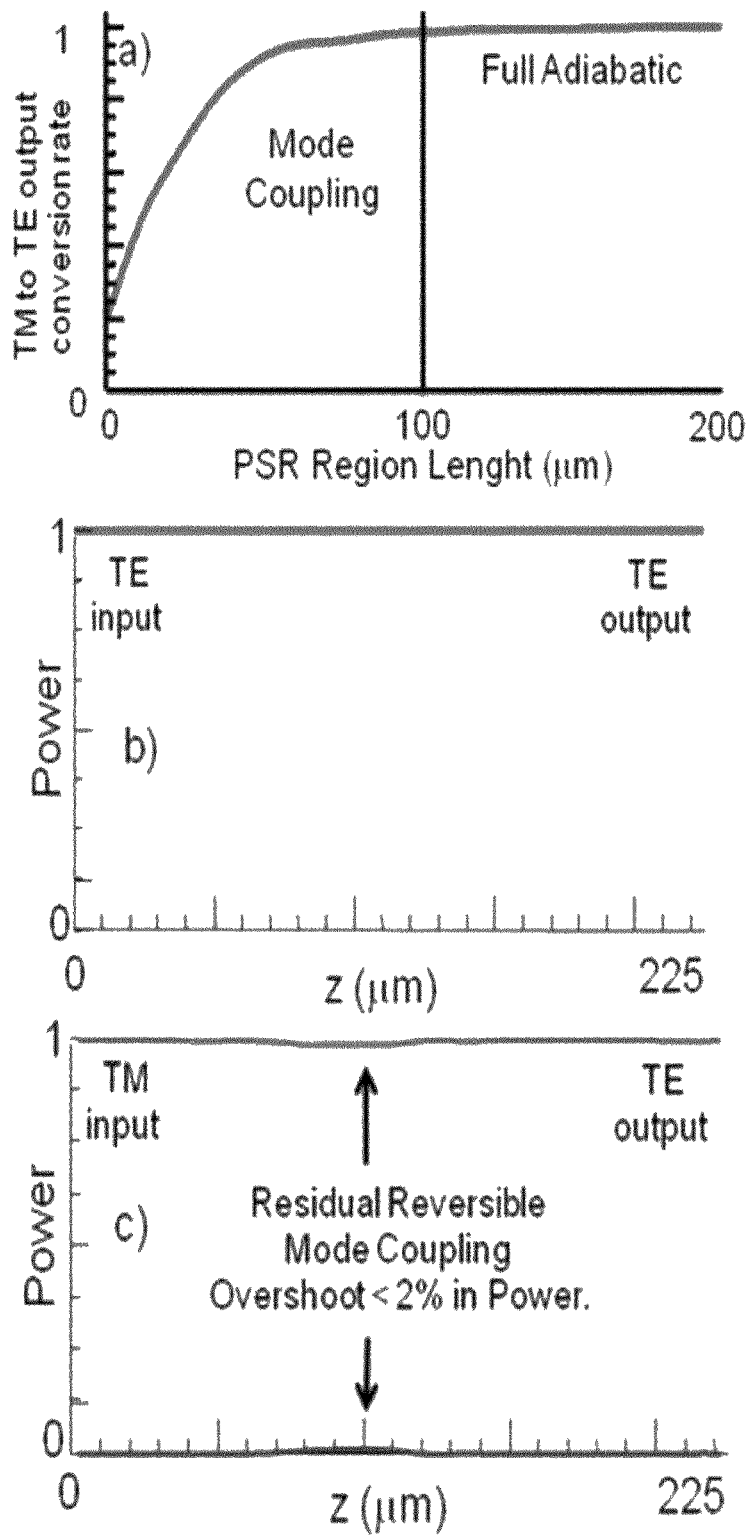
FIG. 12 shows diagrams depicting; a) Adiabatic regime vs. PSR length of the device of FIG. 9; and. modes power upon PSR propagation for TE (b) and TM (c) input respectively.

Since mode coupling is in general strongly wavelength dependant, its suppression according to the previously disclosed amounts will lead to a wider and wider PSR wavelength bandwidth, for example the PSR's disclosed in the embodiments of FIGS. 10, 11, 12 and FIGS. 13, 14 both exhibit a bandwidth exceeding 100 nm centred at $\lambda=1.55$ μm, as shown for example in FIG. 6 for the embodiment of FIGS. 10, 11, 12, and they both show a mode residual reversible mode coupling with a power overshoot lower than 2% when TM is inputted.

With reference to FIGS. 4a and 4b, a first preferred example of a photonic device according to the above embodiment is shown:

The waveguide parameters for said input-output sections can be varied in the following ranges:

1) First waveguide core 1 width: 200÷1500 nm, preferably 300-1200 more preferably 300-500 nm;
2) Second waveguide core 2 width: 0÷1500 nm preferably 100÷1000 nm, more preferably 200÷500 nm;
3) First waveguide core 1 height: 100÷800 nm, preferably 100÷500, more preferably 100÷400 nm;
4) Second waveguide core 2 height: 100÷800 nm, preferably 100÷500 nm, more preferably 100÷400 nm;
5) Top-bottom symmetry-breaking layer 5 height: 10÷2000 nm, preferably 40÷500 nm, more preferably 50÷200 nm;
6) Top-bottom symmetry-breaking layer 5 width: provided it extends over both first and second waveguide cores, or even if it does not extends over both first and second waveguide cores it is in optical contact with both of them, it could indefinitely extend in the lateral direction or having a predetermined width.
7) Gap g: 50÷1000 nm, preferably 100÷500 nm, more preferably 150÷400 nm,
8) Gap $g_1$ between the symmetry-breaking layer 5 and the cores (spacer gap, FIG. 8): 0÷1000 nm, preferably 0÷300 nm, more preferably 0÷100 nm;
9) Device Length: 50÷2000 μm.

Having selected the materials for the waveguide cores 1-2, the top and bottom claddings 3-4 and the symmetry-breaking layer 5, all the aforementioned geometric parameters can be varied independently up to a certain extent which also depends upon materials selection; i.e. until the modes distribution of input/output sections remains the same as previously described, i.e. provided that the input supports TE/TM located in the same waveguide, with the device output within two different waveguides and having the same polarization, preferably TE.

In order to further clarify the above ranges selection, a general design rule for an adiabatic PSR is provided in the following.

1) Select the materials for the optical guiding structure elements in the (non exhaustive) lists disclosed below, namely selecting the materials for said: waveguide cores 1, 2, said top and bottom claddings 3, 4 and said symmetry-breaking layer 5 so that to form a optical guiding structure having a continuous 3D symmetry breaking, namely a symmetry-breaking substantially along the entire PSR length and with said symmetry breaking layer 5 in optical contact with both said waveguide cores 1, 2 substantially along the entire PSR length. The amount of 3D symmetry-breaking can be preferably maximized by selecting the same material for the symmetry-breaking layer 5 and for the waveguide cores 1, 2
2) Arrange all the aforementioned elements at the input section so that to form a optical guiding structure adapted to guide a single mode for each input polarization TE and TM, each mode being substantially located in said first waveguide core 1 at the input section.

This is achieved for example by keeping the second waveguide width narrower than the first waveguide core at the input, if they have the same height (220 or 150 nm in the preferred embodiment). In general the same result is achieved by keeping the area of the second waveguide core 2 lower than the first waveguide core 1 one at the input.

3) Arrange all the aforementioned elements at the output section so that to form a optical guiding structure adapted to guide a first order mode substantially located in said first waveguide core 1 and a second order mode substantially located in said second waveguide core 2 both modes having the same polarization, preferably TE.

This is achieved for example by keeping the second waveguide core 2 width narrower than the first waveguide core 1 at the output, if they have the same height (220 or 150 nm in the preferred embodiment). In general the same result is achieved by keeping the area of the second waveguide core 2 lower than the first waveguide core 1 one at the output.

4) Adiabatically transform said input section in said output one by selecting the PSR length which minimize the modes coupling according to a predetermined mode coupling suppression ratio, in other words, selecting a PSR length so that only a residual reversible mode coupling is observed with a predetermined power overshoot lower than a certain predetermined amount as previously discussed. Additionally and preferably by keeping said second waveguide core 2 width always narrower than said first waveguide core 1 at any PSR section. In general the same result is achieved by keeping the area of the second waveguide core 2 lower than the first waveguide core 1 one at any section.

The preferred material for the waveguides cores 1, 2 is a semiconductor in particular Silicon, AlGaAs, Ge, or another semiconductor, $Si_3N_4$, SIN, SiON or a wide gap semiconductor.

It is worthy to underline that in another embodiment the material of said waveguide core 1, 2 can be different, for example Silicon for the first waveguide core while SiN for the second while the symmetry-breaking layer is made of a third material, for example Si3N4.

The preferred material for the top—bottom symmetry-breaking layer 5 is a semiconductor in particular Silicon, AlGaAs, Ge, or another semiconductor, $Si_3N_4$, SIN, SiON or a wide gap semiconductor The preferred material for the top and bottom claddings 3, 4 is Si3N4, SIN, SiON, glass or air.

In this embodiment, which is also the simplest one, only the width of the second waveguide core is increased form the input section (A) to the output one (B), namely form 250 nm at the input up to 300 nm at the output section while remaining always narrower than said first waveguide core 1 in order to prevent and minimize mode coupling. This is done "slowly" and continuously along the entire device length of 150÷200 μm.

In another embodiments (not shown), both waveguides cores 1, 2 widths can be varied, provided at the input and output sections said second waveguide core 2 is narrower (or even zero at the input section) than said first waveguide core 1. The same holds for said waveguide cores heights.

Upon increasing of said second waveguide core 2 the modes distribution is changed accordingly as previously, and a PSR effect is achieved.

In FIG. 5 it is depicted the TM to TE conversion efficiency vs. the device length. The conversion efficiency is the amount of the inputted TM mode in the first waveguide section 1 which will be converted into the TE mode at the output in the second waveguide section 2.

Since the device is adiabatic a saturation effect is observed and a full adiabatic behaviour is generally reached with a 100÷200 μm device length.

At any shorter device length some residual mode coupling will take place partially hindering the PSR performances; on the other hand once reached the critical length for the adiabatic behaviour (about 100÷200 μm), increasing the PSR length will not further increase the device performances. See the previous discussion about mode coupling minimization.

Another effect of the adiabatic regime is the increase of the bandwidth with respect to a non-adiabatic device. The device of the above example has been designed specifically for an input wavelength of 1,55 μm (in vacuum), however, as a consequence of the adiabatic regime, the operative bandwidth extends for at least 100 nm around said central wavelength. Covering at least the C+L bands of the fibre telecommunication window.

In FIG. 6 the bandwidth of the device of the above example is shown, however this bandwidth behaviour (i.e. greater than 100 nm) is typical of all the embodiments disclosed.

Figure 7:
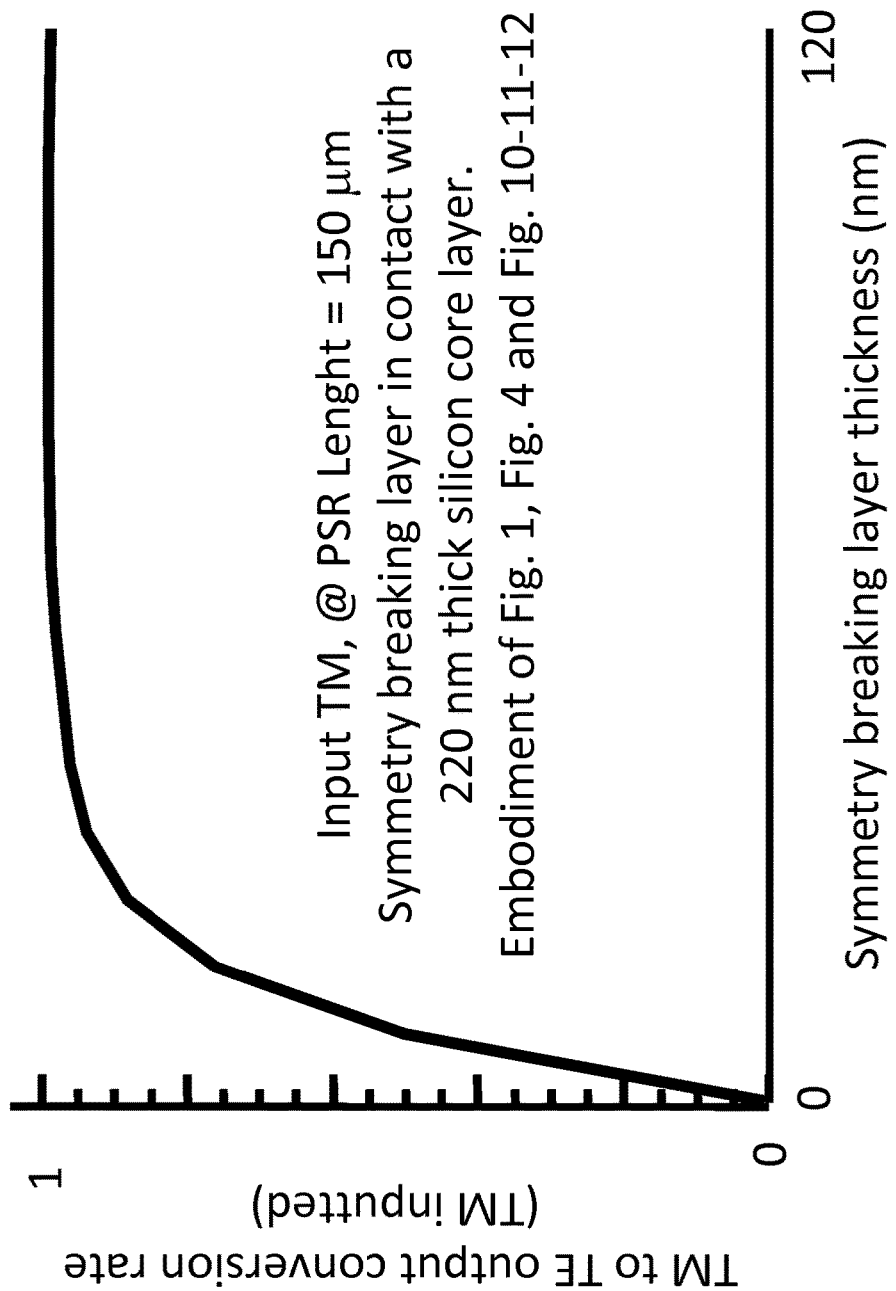
FIG. 7 shows a diagram depicting the effect of the thickness of a top-bottom symmetry-breaking layer on the TM to TE output conversion rate in the device of FIG. 4.

In FIG. 7 the effect of the thickness of said top-bottom symmetry-breaking layer 5 is shown.

In this example, the top-bottom symmetry-breaking layer 5 material is Silicon as for the waveguide core 2, but the curve shape of FIG. 7 is typical of all the embodiments disclosed.

The black and thick curve shows the conversion efficiency vs. the top-bottom symmetry-breaking layer 5 height. The conversion efficiency is the amount of the inputted TM mode in the first waveguide section 1 which will be converted into the TE mode at the output in the second waveguide section 2. This curve has been calculated for a device length of 150 μm.

A saturation effect is again observed with respect to the top-bottom symmetry-breaking layer 5 height.

With reference to FIGS. 1 and 7, the saturation effect can be taken into account by the following formula connecting the thicknesses of the ridge H and the non-etched layer h:

$h/H \leq 1$; preferably: $h/H \leq \frac{1}{2}$, more preferably $h/H \leq \frac{1}{4}$ In another embodiment, shown in FIG. 8, said top-bottom symmetry-breaking layer 5 could be separated by a spacer gap $g_1$ from said waveguide cores 1, 2.

The presence of said spacer gap $g_1$ is a consequence of some fabrication process or can be intentionally left between said layers to be used in other part of the optical chip.

It is apparent that the conversion efficiency drops down exponentially when the spacer gap exceeds a certain value, which mainly depends on the thickness of said waveguide cores 1, 2. For example said separation should not exceed 50÷60 nm for a 220 nm thick Si waveguide while can be higher for a thinner waveguide cores, for example it could be separated by a gap up to about 300÷400 nm for a 150 nm thick silicon or semiconductor waveguide cores.

As a general rule the symmetry-breaking layer should be at the waveguide cores and, if separated by a spacer gap, it should be in any case in optical contact with both of said waveguide cores 1, 2 in order to fully exploit its symmetry-breaking function.

In another embodiment, qualitatively shown for example in FIG. 3 the gap g between said waveguide cores 1, 2 is varied upon propagation.

It is worthy to underline that said waveguide cores need not to be coplanar provided that said symmetry-breaking layer is in optical contact with both of them substantially along the entire PSR length.

It should also be noted that said symmetry-breaking layer 5 could be laterally etched so that to have a width to keep symmetry-breaking layer 5 in optical contact with both said waveguide core 1, 2 substantially along the entire PSR length.

In another embodiment said symmetry-breaking layer 5 could have a height varied upon propagation, i.e. along the PSR device, provided it remains in optical contact with both said waveguide core 1, 2 substantially along the entire PSR length.

In another embodiment said symmetry-breaking layer 5 could be formed by a series of further layers.

In another embodiment none of said waveguide cores 1, 2 width are varied, but they simply get closer to one another.

EXAMPLE

For a full illustration of the photonic device design and functioning, reference is made to FIG. 10. A 50 nm thick Poly-Si layer is in contact, or in close proximity, to the 220 nm thick Si layer of an SOI wafer or, alternatively, an all Si ridge waveguide can be used (not shown here). Said Poly-Si layer is unetched and extends through the entire device length continuously breaking the vertical symmetry with respect to the main waveguide. At the same time, symmetry is also continuously broken in the horizontal direction by the Si perturbing waveguide. Main and perturbing waveguides are separated by a 150 nm gap constant throughout the entire device length. A $SiO_2$ top cladding is used. A scrambled TE/TM signal is inputted in the 450 nm wide Si waveguide which is single mode for each polarization at $\lambda=1,5$ μm. The PSR length is 150 μm. A 25 μm long adiabatic transition is used to bring the main and perturbing waveguides in close proximity and a 50 μm long adiabatic one to separated them, leading to an overall device length of 225 μm.

The mode distribution of the PSR input section consists of four guided modes having the shape sketched in FIG. 11a, namely a $1^{st}$ (S-mode 1) and a $2^{nd}$ (S-mode 2) TE and TM modes substantially located in the main waveguide and a $3^{rd}$ (S-mode 3) and $4^{th}$ (S-mode 4) weakly guided TE/TM modes substantially located in the perturbing waveguide. The PSR output section differs from the input one in that the width of the perturbing waveguide is increased up to 300 nm thus improving its guidance property. All the other parameters are unchanged leading to mode distribution shown in FIG. 11c at the PSR output: a $1^{st}$ TE mode (S-mode 1) located in the main waveguide, a $2^{nd}$ TE mode (S-mode 2) substantially located in the perturbing waveguide, a $3^{rd}$ (S-mode 3) and a $4^{th}$ (S-mode 4) TM modes respectively located in the main waveguide and in the perturbing one.

When the input section undergoes an adiabatic transformation into the output one, the modes will evolve accordingly propagating along the device with the effective indexes shown in FIG. 11b. Consequently the inputted TE mode (S-mode 1) will substantially propagate unchanged through the PSR; conversely the inputted TM mode (S-mode 2) will be displaced from the main waveguide at the input to the perturbing waveguide at the output, thereby undergoing a polarization splitting, while at the same time it will be rotated to a TE polarization. This is apparent in FIGS. 11b and 11c, where TE/TM modes different propagation behavior is shown.

Due to the simultaneous vertical and horizontal symmetry-breaking along the entire device length, both polarization splitting and rotation take place at the same time and it is not possible to clearly identify a splitting section and a rotating one as in Daoxin Dai et al. and in Wesley D. Sacher et al. This leads to a more compact device—about two times shorter than prior art—since the intermediate $TM_0$-$TE_1$ mode conversion is not necessary and the splitting and rotating sections are unified together.

With Ref. to FIG. 10, an adiabatic three-dimensional symmetry-breaking is achieved by slowing increasing the width of the perturbing waveguide while vertical symmetry-breaking layer extends continuously from the input to the output. Its presence will remove modes degeneracy by making modes (S-mode 2) and (S-mode 3) hybrid in the region where their indexes are closer spaced. The higher the perturbation of the symmetry-breaking layer, the shorter the device. The maximum of the symmetry-breaking takes place when the symmetry-breaking material is the same as the waveguide one, or has a similar index. In FIG. 12a the effect of the symmetry-breaking layer thickness is shown in the embodiment of FIG. 10 wherein said layer is in contact with a 220 nm Si thick waveguide layer. A saturation effect is evident so that a relatively thin 50 nm Poly-Si layer can be used in order to minimize the Poly-Si scattering losses.

As a general rule the symmetry-breaking layer thickness can be of the order of ¼ of the waveguide core thickness (50 nm vs. 220 nm) if of the same material and at contact. It could be slightly thicker if separated from the waveguide core, but said separation should not exceed 50-60 nm for a 220 nm thick Si waveguide while can be slightly higher for a thinner waveguide cores, for example it could be separated by a gap up to about 300÷400 nm for a 150 nm thick silicon or semiconductor waveguide cores.

In FIGS. 12b and 12c, it is respectively shown the power along the propagation when TE/TM are inputted. In FIG. 12 a it is shown that the PSR is fully adiabatic at a length exceeding 100 μm while at a shorter lengths modes coupling is observed when TM is inputted. At a PSR length of 150 μm, only some residual reversible mode coupling is observed which could be further reduced by increasing the PSR length or by a nonlinear tapering. A bandwidth exceeding 100 nm centered at l=1,55 μm is easily achieved due to the device full adiabatic behavior at a PSR length of 150 μm.

For this embodiment, namely for the embodiment of FIGS. 9, 10, 11, 12, the geometrical parameters can be preferably selected in the following ranges:
1) First waveguide core 1 width: 200÷1000 nm, preferably 300÷800 nm, more preferably 300÷500 nm;
2) Second waveguide core 2 width: 0÷500 nm preferably 100÷350 nm, more preferably 200÷300 nm;
3) First waveguide core 1 height: 100÷400 nm, preferably 100÷300, more preferably 100÷250 nm;
4) Second waveguide core 2 height: 100÷400 nm, preferably 100÷300, more preferably 100÷250 nm;
5) Top-bottom symmetry-breaking layer 5 height: 10÷200 nm, preferably 30÷100 nm, more preferably 40÷60 nm;
6) Top-bottom symmetry-breaking layer 5 width: provided it extends over both first and second waveguide cores, or even if it does not extends over both first and second waveguide cores it is in optical contact with both of them, it could indefinitely extend in the lateral direction or having a predetermined width.
7) Gap g: 50÷400 nm, preferably 100÷300 nm, more preferably 150÷250 nm,
8) Spacer gap $g_1$ between the symmetry-breaking layer 5 and the cores: 0÷200 nm, preferably 0÷200 nm, more preferably 0÷100 nm;
9) Device Length: 50÷1000 μm.

Figure 14:
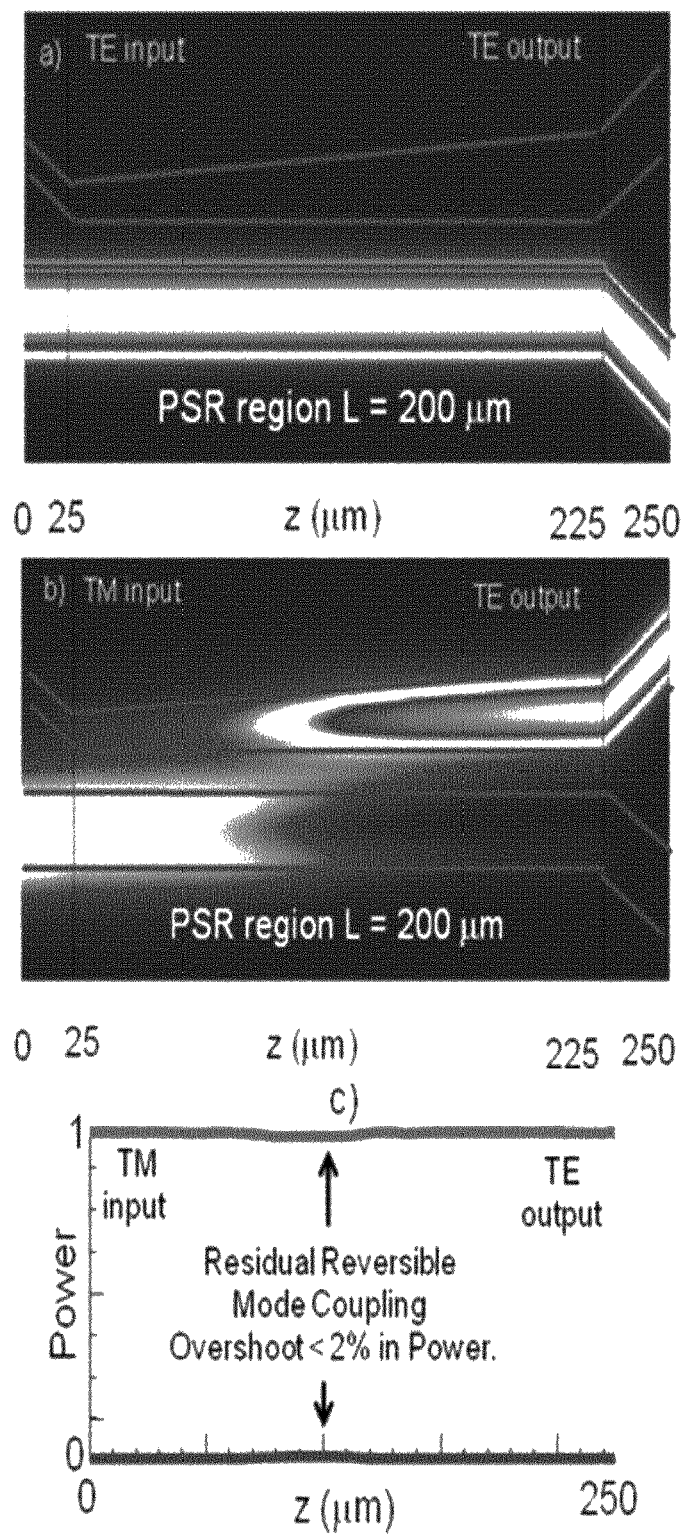
FIG. 14 shows a top view of the TE/TM propagation in the device of FIG. 13: TE IN (a), and TM IN (b) and the modes power upon the PSR propagation for TM IN (c).

As a further example, a $Si_3N_4$ on SOI PSR is demonstrated exploiting a continuous 3D symmetry-breaking and using the same layers arrangement and feature size of Tymon Barwicz et al. The $Si_3N_4$ layer being un-etched could simplify the alignment tolerances with respect to the PSR therein fabricated. In FIG. 14, PSR parameters are shown.

In FIG. 15, it is demonstrated that a full adiabatic behavior is reached in a PSR length of 200 μm. A 25 μm long adiabatic transition is used to bring the main and perturbing waveguides in close proximity and a 25 μm long adiabatic one to separated them, leading to an overall device length of 250 μm. Reversible residual mode coupling with an overshoot lower than 2% in power is observed and could be reduced as discussed for the SOI case. A bandwidth exceeding 100 nm at λ=1,55 μm is achieved due to full adiabatic behavior at a PSR length of 200 μm.

For this embodiment, namely for the embodiment of FIGS. 13, 14, the geometrical parameters can be preferably selected in the following ranges:
1) First waveguide core 1 width: 200÷1000 nm, preferably 300÷800 nm, more preferably 500÷700 nm;
2) Second waveguide core 2 width: 0÷600 nm preferably 100 ÷500 nm, more preferably 200÷400 nm;
3) First waveguide core 1 height: 100÷300 nm, preferably 100÷200, more preferably 100÷150 nm;
4) Second waveguide core 2 height: 100÷300 nm, preferably 100÷200, more preferably 100÷150 nm;
5) Top-bottom symmetry-breaking layer 5 height: 100÷1000 nm, preferably 200÷500 nm, more preferably 300÷400 nm;
6) Top-bottom symmetry-breaking layer 5 width: provided it extends over both first and second waveguide cores, or even if it does not extends over both first and second waveguide cores it is in optical contact with both of them, it could indefinitely extend in the lateral direction or having a predetermined width.
7) Gap g: 50÷800 nm, preferably 100÷300 nm, more preferably 150÷250 nm,
8) Spacer gap $g_1$ between the symmetry-breaking layer (5) and the cores: 0÷500 nm, preferably 0÷300 nm, more preferably 0÷100 nm;
9) Device Length: 50÷2000 μm.

All the PSRs herein disclosed can be fabricated by standard lithographic/etching processes as the ones used for example in the cited prior art.

To the above disclosed photonic device a person skilled in the art, to meet specific and contingent needs, could provide several modifications and variations, all of them anyway falling within the protection scope of the present invention, as defined by the appended claims.

The invention claimed is:
1. An integrated adiabatic polarization splitting and rotating photonic device comprising:
at least one first waveguide core;
a second waveguide core, both said waveguide cores extending from an input section to an output section and being separated by a gap at least at said output section;

a top cladding, a bottom cladding and a symmetry-breaking layer so as to form an optical guiding structure in a chip, said top and bottom claddings extending throughout the whole optical guiding structure sandwiching said waveguide cores therebetween;

the symmetry-breaking layer being in optical contact with both said waveguide cores along the entire polarization splitting and rotating photonic device length, and said symmetry-breaking layer being laterally etched, to have a width to keep the symmetry-breaking layer in optical contact with both said waveguide cores along the entire polarization splitting and rotating photonic device length, wherein:

at the input section, the at least one first waveguide core has a predetermined width at the input section, receiving an input light signal of arbitrary polarization;

the second waveguide core, both at the input and the output section, has a width narrower than said predetermined width of the first waveguide core so that the optical guiding structure guides a first mode with the highest effective refractive index substantially confined within said at least one first waveguide core and a second mode with the second highest effective refractive index substantially confined within said first waveguide core said first and said second modes having a different polarization at the input section; and so that the optical guiding structure guides a first mode with the highest effective refractive index substantially confined within said at least one first waveguide core and a second mode with the second highest effective refractive index substantially confined within said second waveguide core said first and said second modes having the same polarization at the output section;

and wherein at least the second waveguide core varies the width thereof from a width at the input section to a width at the output section so that said first mode with the highest effective refractive index of the input section is converted upon an adiabatic propagation into said first mode with the highest effective refractive index of the output section and said second mode with the second highest effective refractive index of the input section is converted upon adiabatic propagation into said second mode with the second highest effective refractive index of the output section.

2. Integrated polarization splitting and rotating photonic device according to claim 1, wherein the second waveguide core is tapered from the output section to the input section.

3. Integrated polarization splitting and rotating photonic device according to claim 1, wherein said symmetry-breaking layer extends throughout the whole optical guiding structure.

4. Integrated polarization splitting and rotating photonic device according to claim 1, wherein said waveguide cores are made of Silicon, AlGaAs, Ge, $Si_3N_4$, or SIN.

5. Integrated polarization splitting and rotating photonic device according to claim 1, wherein the symmetry-breaking layer is in contact with the top or the bottom sides of the waveguide cores.

6. Integrated polarization splitting and rotating photonic device according to claim 1, wherein a spacer gap ($g_1$) between the symmetry-breaking layer and the cores varies in a range from 0 to 1000 nm.

7. Integrated polarization splitting and rotating photonic device according to claim 1, wherein the relationship between the thicknesses of the ridge H and of the non-etched layer h is h/H≤1.

8. Integrated polarization splitting and rotating photonic device according to claim 1, wherein a spacer gap ($g_1$) between the symmetry-breaking layer and the cores varies in a range from 0 to 1000 nm.

9. Integrated polarization splitting and rotating photonic device according to claim 1, wherein the relationship between the thicknesses of the ridge H and of the non-etched layer h is h/H≤1.

10. An integrated adiabatic polarization splitting and rotating photonic device comprising:

at least one first waveguide core;

a second waveguide core, both said waveguide cores extending from an input section to an output section and being separated by a gap at least at said output section;

a top cladding, a bottom cladding and a symmetry-breaking layer so as to form an optical guiding structure in a chip, said top and bottom claddings extending throughout the whole optical guiding structure sandwiching said waveguide cores therebetween;

the symmetry-breaking layer being in optical contact with both said waveguide cores along the entire polarization splitting and rotating photonic device length, wherein:

at the input section, the at least one first waveguide core has a predetermined width at the input section, receiving an input light signal of arbitrary polarization;

the second waveguide core, both at the input and the output section, has a width narrower than said predetermined width of the first waveguide core, so that the optical guiding structure guides a first mode with the highest effective refractive index substantially confined within said at least one first waveguide core and a second mode with the second highest effective refractive index substantially confined within said first waveguide core said first and said second modes having a different polarization at the input section; and so that the optical guiding structure guides a first mode with the highest effective refractive index substantially confined within said at least one first waveguide core and a second mode with the second highest effective refractive index substantially confined within said second waveguide core said first and said second modes having the same polarization at the output section;

and wherein at least the second waveguide core varies the width thereof from a width at the input section to a width at the output section so that said first mode with the highest effective refractive index of the input section is converted upon an adiabatic propagation into said first mode with the highest effective refractive index of the output section and said second mode with the second highest effective refractive index of the input section is converted upon adiabatic propagation into said second mode with the second highest effective refractive index of the output section wherein the refractive index of the symmetry-breaking layer material is the same as that of the waveguide cores.

11. Integrated polarization splitting and rotating photonic device according to claim 10, wherein the second waveguide core is tapered from the output section to the input section.

12. Integrated polarization splitting and rotating photonic device according to claim 10, wherein said symmetry-breaking layer extends throughout the whole optical guiding structure.

13. Integrated polarization splitting and rotating photonic device according to claim 10, wherein said waveguide cores are made of Silicon, AlGaAs, Ge, $Si_3N_4$, or SIN.

14. Integrated polarization splitting and rotating photonic device according to claim 10, wherein the symmetry-breaking layer is in contact with the top or the bottom sides of the waveguide cores.

* * * * *